US 7,920,760 B2

(12) United States Patent
Yoda

(10) Patent No.: US 7,920,760 B2
(45) Date of Patent: Apr. 5, 2011

(54) IMAGE ORGANIZING DEVICE AND METHOD, AND COMPUTER-READABLE RECORDING MEDIUM STORING IMAGE ORGANIZING PROGRAM

(75) Inventor: Akira Yoda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1032 days.

(21) Appl. No.: 11/730,096

(22) Filed: Mar. 29, 2007

(65) Prior Publication Data

US 2007/0236729 A1    Oct. 11, 2007

(30) Foreign Application Priority Data

Mar. 31, 2006 (JP) ................... 2006-099210

(51) Int. Cl.
 *G06K 9/54* (2006.01)
 *G06F 3/12* (2006.01)
(52) U.S. Cl. ...................... 382/305; 358/1.15
(58) Field of Classification Search .......... 382/305, 382/307, 312; 358/1.15, 1.18, 1.9; 707/7, 707/102, 594, 200; 345/231.2, 231.3, 231.4; 434/308, 309, 318, 455, 619
See application file for complete search history.

(56) References Cited

U.S. PATENT DOCUMENTS

| 6,606,411 | B1 |    | 8/2003 | Loui et al. |
| 7,148,990 | B2 | * | 12/2006 | Atkins et al. ............. 358/1.18 |
| 7,286,723 | B2 | * | 10/2007 | Taugher et al. ............. 382/305 |
| 7,636,898 | B2 | * | 12/2009 | Takahashi ................. 715/769 |
| 2004/0017376 | A1 | * | 1/2004 | Tagliabue et al. ............ 345/581 |
| 2005/0271352 | A1 |    | 12/2005 | Yokouchi |
| 2006/0120686 | A1 | * | 6/2006 | Liebenow .................. 386/40 |

FOREIGN PATENT DOCUMENTS

| JP | 2003-271617 A | 9/2003 |
| JP | 2004-15403 A | 1/2004 |
| JP | 2005-37992 A | 2/2005 |
| JP | 2006-78805 A | 3/2006 |

OTHER PUBLICATIONS

Foreign Office Action issued on Jan. 18, 2011 in corresponding JP Patent Application 2006-099210.

* cited by examiner

*Primary Examiner* — Kanji Patel
(74) *Attorney, Agent, or Firm* — Birch, Stewart, Kolasch & Birch, LLP

(57) ABSTRACT

An organizing condition for organizing a plurality of inputted images based on at least one of a content of each inputted image and an associated attribute of each inputted image is stored for each user. When a plurality of newly inputted images are organized, the stored organizing condition associated with the user who carries out the organization is acquired, and the newly inputted images are organized based on the acquired organizing condition.

11 Claims, 11 Drawing Sheets

FIG.7

EXTRACTING CONDITION — 41A, 41C

- [✓] SHOOTING DATE AND TIME = JANUARY 1, 2005 – DECEMBER 1, 2005 — SET/CHANGE (41B, 41D)
- [✓] PERSON = [ ] — SET/CHANGE
- [ ] SHOOTING LOCATION = — SET/CHANGE
- [ ] REMOVE DEFECTIVE PHOTO

GROUPING CONDITION — 41E

| | | |
|---|---|---|
| [✓] | ← → | SHOOTING YEAR (41F, 41H, 41G, 41J) |
| [✓] | ← → | SHOOTING MONTH |
| [✓] | ← → | PERSON |
| [ ] | ← → | SHOOTING DATE |
| [ ] | ← → | SHOOTING LOCATION |
| [ ] | ← → | CONTENT (EVENT) |

SORTING CONDITION — 41K

| | | | 41Q | 41R |
|---|---|---|---|---|
| [✓] | ← → | SHOOTING YEAR (41M, 41N, 41P) | ASCENDING ORDER | DESCENDING ORDER |
| [✓] | ← → | SHOOTING MONTH | ASCENDING ORDER | DESCENDING ORDER |
| [✓] | ← → | SHOOTING DATE | ASCENDING ORDER | DESCENDING ORDER |
| [✓] | ← → | SHOOTING TIME | ASCENDING ORDER | DESCENDING ORDER |
| [ ] | ← → | SHOOTING LOCATION | ASCENDING ORDER | DESCENDING ORDER |
| [ ] | ← → | PERSON | ASCENDING ORDER | DESCENDING ORDER |

| CUSTOMER ID | SEQUENTIAL NUMBER | TITLE | ORGANIZING CONDITION | | |
|---|---|---|---|---|---|
| | | | EXTRACTING CONDITION | GROUPING CONDITION | SORTING CONDITION |
| ABC0001 | 01 | "NAME"'S GROWTH RECORD (MM/YY-1 TO MM/YY-2) | PERSON ID="ABC0001_01" | SHOOTING DATE AND TIME (YY) SHOOTING DATE AND TIME (MM) | SHOOTING DATE, ASCENDING ORDER |
| ABC0001 | 02 | ATHLETIC MEET | φ | EVENT FEATURE QUANTITY | SHOOTING DATE, ASCENDING ORDER |
| ... | ... | ... | ... | ... | ... |
| DEF0001 | 01 | FOR DISTRIBUTION | PERSON ID="DEF0001_00" - "DEF0001_04" AND REMOVE DEFECTIVE PHOTOS | PERSON ID SHOOTING DATE AND TIME (YY) SHOOTING DATE AND TIME (MM) | SHOOTING DATE, ASCENDING ORDER |
| ... | ... | ... | ... | ... | ... |
| ZZZ9999 | 01 | φ | φ | PERSON ID SHOOTING DATE AND TIME (YY) SHOOTING DATE AND TIME (MM) | SHOOTING DATE, ASCENDING ORDER |
| ZZZ9999 | 02 | φ | φ | SHOOTING DATE AND TIME (YY) SHOOTING DATE AND TIME (MM) SHOOTING LOCATION | SHOOTING DATE, ASCENDING ORDER |
| ZZZ9999 | 03 | φ | φ | EVENT FEATURE QUANTITY | SHOOTING DATE, ASCENDING ORDER |

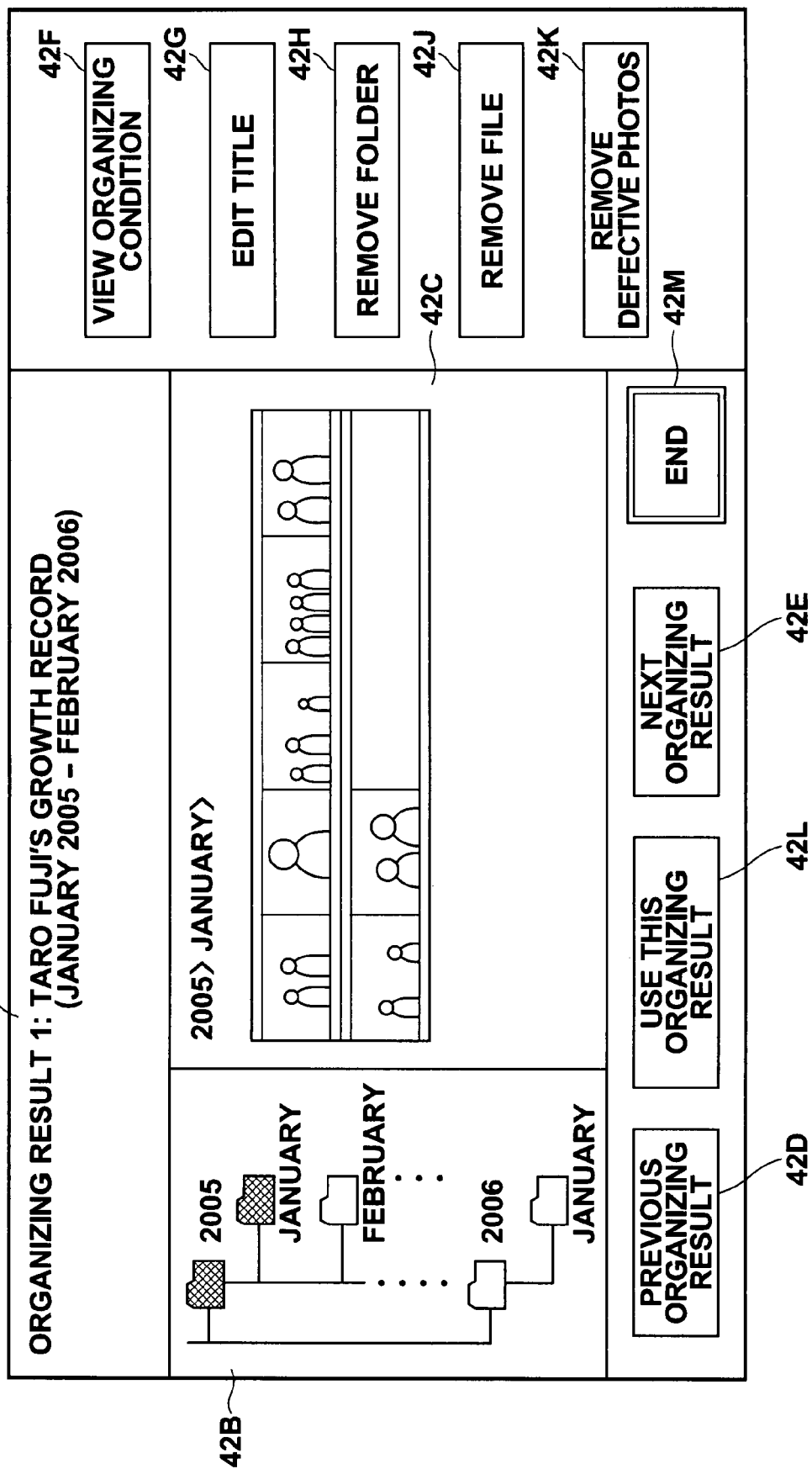

IMAGE ORGANIZING DEVICE AND METHOD, AND COMPUTER-READABLE RECORDING MEDIUM STORING IMAGE ORGANIZING PROGRAM

BACKGROUND OF THE INVENTION

1. Field of the Invention

The present invention relates to an image organizing device and an image organizing method for classifying and organizing a part of or all of a plurality of images into at least one group, as well as a computer-readable recording medium storing a program for causing a computer to exert control to implement the image organizing method.

2. Description of the Related Art

Since the cost of photographing using a digital camera is lower than that using a silver salt film camera by the cost of the films, users of digital cameras tend to photograph more images. This tendency is further promoted by the increase in capacity of recording media for use with the digital cameras, which are removably mounted on the digital cameras. Consequently, a huge number of images may be stocked in a storage medium, such as a recording medium of the digital camera, or a hard disk of a personal computer or a CD-R, on which image data read out from the recording medium is stored. The stocked images often contain both necessary images (good photos) and unnecessary images (defective photos, overlapping photos, or the like), and such images often remain unclassified.

It is very troublesome to classify and organize a large number of images. Therefore, a device for supporting a user to search and extract necessary images, extract and delete unnecessary images from the stocked images, and classify and organize the necessary images based on the date and time and the location of each of the events of the scenes in the images has been proposed.

Proposed techniques include, for example, automatically classifying a plurality of images with respect to the time and the event (similarities between the images based on image analysis) (see, for example, U.S. Pat. No. 6,606,411), automatically classifying with respect to the shooting location and the shooting date and time (see, for example, Japanese Unexamined Patent Publication No. 2005-037992), and automatically classifying with respect to associated information (such as the shooting date and time) and secondary information (such as the weather, the country name) obtained from the associated information (such as the shooting date and time, the GPS information) (see, for example, Japanese Unexamined Patent Publication No. 2003-271617).

Further, a technique has been proposed where a user defines his or her desired classification pattern as classification conditions and stores the classification conditions in the digital camera. When the user has photographed images using the camera, his or her classification condition is described in the tag of each photographed image, so that the images photographed by the user are classified according to his or her classification conditions (see, for example, U.S. Patent Application Publication No. 20050271352).

However, in the automatic classification techniques described in the above-mentioned U.S. Pat. No. 6,606,411 and Japanese Unexamined Patent Publication Nos. 2005-037992 and 2003-271617, uniform classification conditions are applied to images of all users to carry out uniform image organizing operations. Therefore, the result of the classification does not necessarily meet the point of view of classification desired by each user. Although the technique described in U.S. Patent Application Publication No. 20050271352 allows the user to carry out classification on a viewpoint desired by the user, it is troublesome for the user to associate the images with the classification conditions at each time of photographing.

SUMMARY OF THE INVENTION

In view of the above-described circumstances, the present invention is directed to provide a device and a method as well as a computer-readable recording medium storing a program for implementing automatic organization of images that meets a viewpoint of organization desired by each user, without necessitating troublesome manipulations by the user.

An aspect of the image organizing method of the invention is an image organizing method including: storing, for each user, an organizing condition for organizing a plurality of inputted images based on at least one of a content of each inputted image and an associated attribute of each inputted image; when a plurality of newly inputted images are organized, acquiring the stored organizing condition associated with the user who carries out the organization; and organizing the newly inputted images based on the acquired organizing condition.

The image organizing device of the invention is to implement the above-described image organizing method. A first aspect thereof is an image organizing device including: an image organizing means for organizing a plurality of images inputted thereto based on at least one of a content of each inputted image and an associated attribute of each inputted image; an organizing condition storing means for storing an organizing condition used in organization carried out by the image organizing means, the organizing condition being associated with user identifying information for identifying a user of the device; a user identifying information receiving means for receiving an input of the user identifying information; and an organizing condition acquiring means for acquiring the organizing condition associated with the inputted user identifying information from the organizing condition storing means, wherein the image organizing means carries out organization of newly inputted images based on the acquired organizing condition.

A second aspect of the image organizing device of the invention is an image organizing device including: an image organizing means for organizing a plurality of images inputted thereto based on at least one of a content of each inputted image and an associated attribute of each inputted image; an organizing condition outputting means for storing an organizing condition used in organization carried out by the image organizing means in a storage medium carried by a user of the device, the storage medium being readable and writable by the device; and an organizing condition acquiring means for acquiring the organizing condition from the storage medium, wherein the image organizing means carries out organization of newly inputted images based on the acquired organizing condition.

The computer-readable recording medium of the invention records a program for causing a computer to execute the above-described image organizing method, in other words, a program causing a computer to operate as the above-described image organizing device. Namely, a first aspect of the computer-readable recording medium storing an image organizing program of the invention is a computer-readable recording medium storing an image organizing program for causing a computer to operate as: an image organizing means for organizing a plurality of images inputted thereto based on at least one of a content of each inputted image and an associated attribute of each inputted image; an organizing condition storing means for storing an organizing condition used in organization carried out by the image organizing means, the organizing condition being associated with user identifying information for identifying a user of the device; a user identifying information receiving means for receiving an input of the user identifying information; and an organizing condition acquiring means for acquiring the organizing condition associated with the inputted user identifying information from the organizing condition storing means, wherein the image organizing means carries out organization of newly inputted images based on the acquired organizing condition.

A second aspect of the computer-readable recording medium storing an image organizing program of the invention is an computer-readable recording medium storing an image organizing program for causing a computer to operate as: an image organizing means for organizing a plurality of images inputted thereto based on at least one of a content of each inputted image and an associated attribute of each inputted image; an organizing condition outputting means for storing an organizing condition used in organization carried out by the image organizing means in a storage medium carried by a user of the device, the storage medium being readable and writable by the device; and an organizing condition acquiring means for acquiring the organizing condition from the storage medium, wherein the image organizing means carries out organization of newly inputted images based on the acquired organizing condition.

Here, details of the image organizing device, the image organizing method and the computer-readable recording medium storing the image organizing program of the invention will be explained.

"Organizing" images may include at least one of extracting a part of or all of the plurality of images, classifying the plurality of images into at least one group, and/or sorting the plurality of images.

Therefore, the "organizing condition" may include at least one of an extracting condition for extracting the images, a grouping condition for grouping the images, and a sorting condition for sorting the images. The extracting condition, the grouping condition and the sorting condition are defined using one or more of a content of each inputted image and/or an associated attribute (described later) of each inputted image.

The "content" of the image may include information obtained through image analysis such as presence or absence of a subject (such as a face of a person) in the image, a photographing condition and/or image quality, as well as information obtained through a matching process using a reference dictionary, such as a name of a person in the image and/or presence or absence of a specific subject.

Specific examples of the "associated attribute" of the image may include: information associated with the image and recorded when the image is photographed, such as shooting date and time, shooting location, a model name of the photographing device, and photographing conditions such as photographing mode, shutter speed, aperture and flash; information associated with the image and recorded after the image has been photographed mainly by manual input, such as title of the image, keyword and a name of the photographer, and information representing access frequency to the image, such as the number of times of referencing and/or referencing time, which is associated with the image and updated after the image has been photographed. The information may be associated with the image data and recorded as a tag based on the Exif standard, for example. It should be noted that the information of the shooting location may be acquired, for example, by a means provided in the photographing device for acquiring GPS information (latitude and longitude) or positional information in mobile communication (such as information of base stations).

Specific examples of the "user identifying information" may include attribute information in a form of a string of characters, symbols and/or numbers such as a user ID, user's name, user's birthday and/or phone number, and attribute information in a form of biometric data such as user's fingerprint, iris pattern, face and/or signature.

The "input of the user identifying information" may be made, for example, by manual input by the user via an input device such as a keyboard, may be read in by a reading device such as a card reader when the user identifying information is stored in a bar code, a magnetic stripe or an IC of a recording medium such as a card, or may be read and inputted via a biometric data reading/inputting device.

Specific examples of the "storage medium carried by a user of the device (the second aspect of the image organizing device according to the invention), which is readable and writable by the device" may include an IC card readable/writable by the image organizing device, as well as a memory card and a CD-ROM in which images to be inputted to the image organizing device to be organized are recorded.

In the invention, a plurality of organizing conditions may be stored for each user. That is, organizing conditions respectively used in a plurality of patterns of image organization may be stored for each user. For example, in the first aspect of the image organizing device of the invention, the organizing conditions may be stored with being associated with the user identifying information of a single user. In this case, the organizing conditions associated with the inputted user identifying information are acquired, and multiple patterns of image organizing processes are carried out based respectively on the acquired organizing conditions. In the second aspect of the image organizing device of the invention, the organizing conditions for the plurality of organizing patterns may be stored in the storage medium. In this case, the organizing conditions are acquired when newly inputted images are organized, and multiple patterns of image organizing processes are carried out based respectively on the acquired organizing conditions.

In the aspect where the multiple patterns of image organizing processes are carried out, preferability of each of the organizing results in the multiple patterns may be evaluated. The "preferability of the organizing result" may be evaluated based, for example, on at least one of the number of extracted images, the number of classified groups, the number of images in each group, and a degree of deviation of the numbers of images in the respective groups.

Further, the organizing results may be displayed in a manner that the higher the preferability of the organizing result, the higher a display priority of the organizing result. Displaying the organizing results "in a manner that the higher the preferability of the organizing result, the higher the display priority of the organizing result" may include, for example, displaying the organizing results in the order of the evaluated ranks of preferability, displaying the evaluation value indicating the preferability of each organizing result together with the organizing result so that the organizing result(s) having the higher preferability is identifiable, or displaying only the organizing result evaluated as being the most preferable.

BRIEF DESCRIPTION OF THE DRAWINGS

FIG. 7 is a representation of one example of an organizing condition setting screen;

FIG. 8 is a representation of one example of an organizing condition table;

FIG. 10 is a representation of one example of an organizing result display screen.

DESCRIPTION OF THE PREFERRED EMBODIMENTS

Hereinafter, embodiments of the present invention will be described in detail with reference to the drawings.

Figure 1:
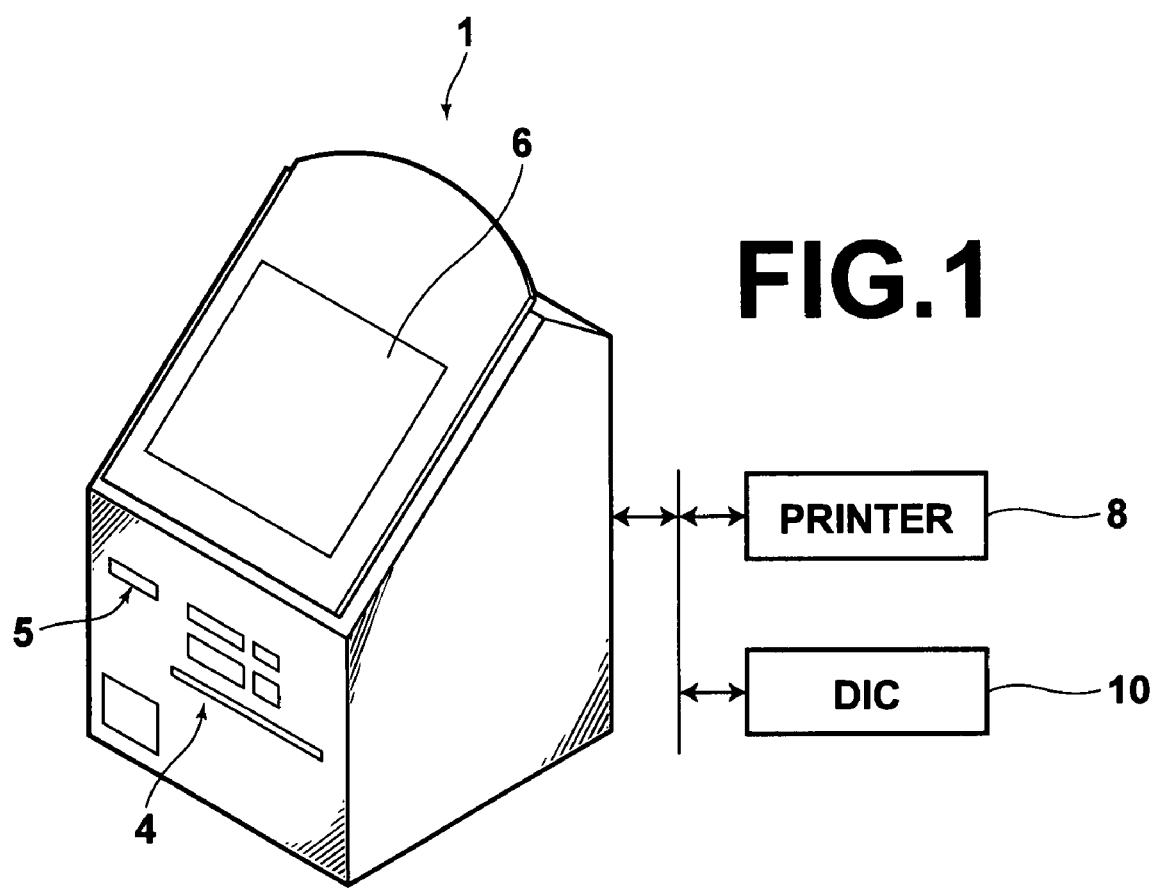
FIG. 1 is an isometric view illustrating the appearance of an order receiving device, to which an image organizing device according to a first embodiment of the present invention is applied.

FIG. 1 is an isometric view showing the appearance of a photo-print order receiving device including an image organizing device according to a first embodiment of the invention. as shown in FIG. 1, the order receiving device 1 of the first embodiment of the invention is to be installed at a photo print shop for receiving print orders from users. The order receiving device 1 includes: a card slot 4 of various types for receiving a memory card 2 of various types, which stores images to be printed, and reading images recorded in the memory card 2 or recording images in the memory card 2; a card reader 5 for reading a magnetic card 3 on which a customer ID is recorded; and a display unit 6 for displaying various screens for print order. The order receiving device 1 is connected, via a network, to a printer 8 for carrying out photo printing according to an order from a customer and a digital image controller (DIC) 10 for applying image processing to the images and managing the print orders. The display unit 6 is provided with a touch panel-type input unit 18, and the user can make necessary input for ordering print or organizing images by touching the display unit 6 according to the display on the display unit 6.

Figure 2:
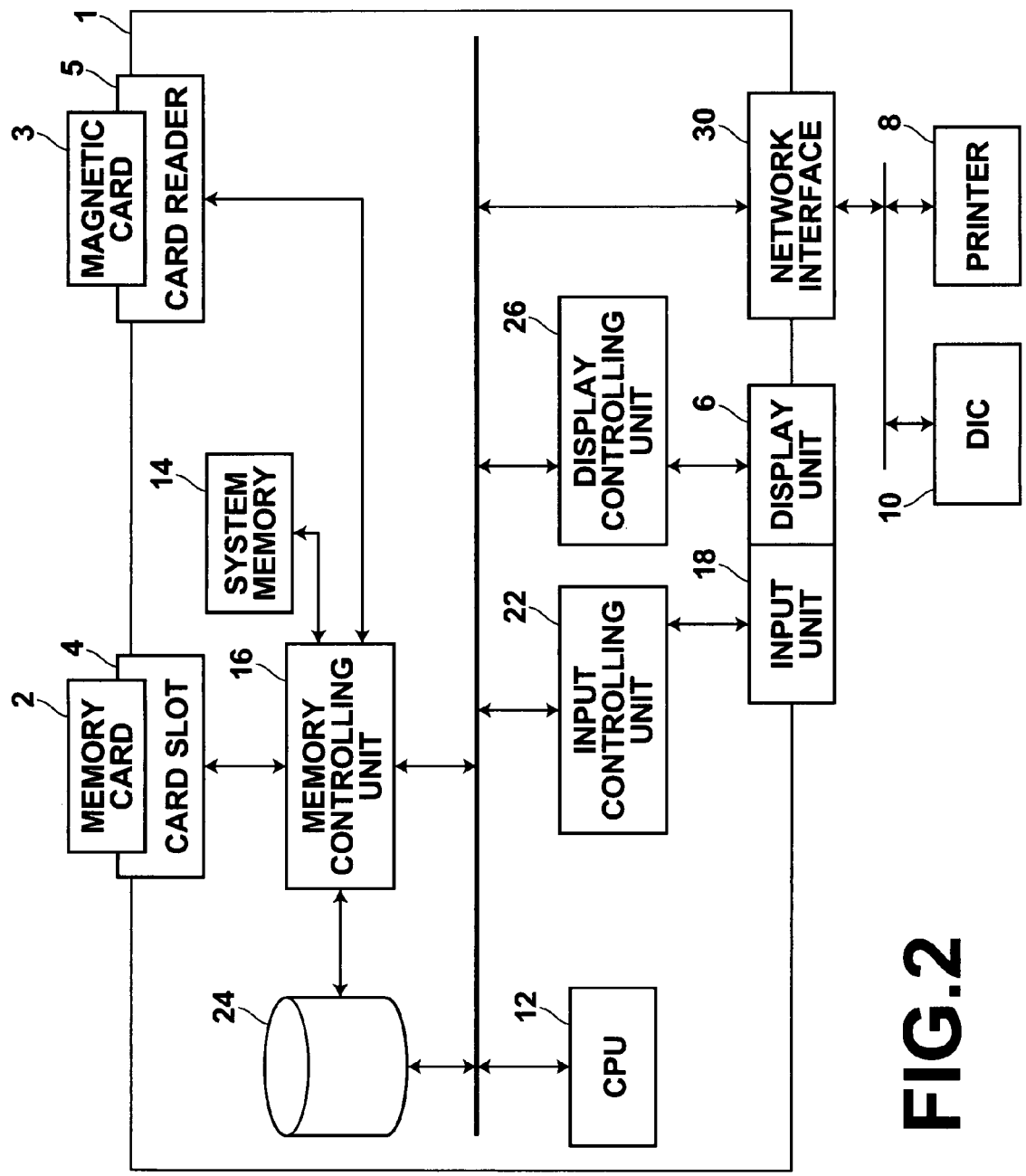
FIG. 2 is a schematic block diagram illustrating the configuration of the order receiving device according to the first embodiment of the invention.

FIG. 2 is a schematic block diagram illustrating the configuration of the order receiving device 1 according to the embodiment of the invention. As shown in FIG. 2, the order receiving device 1 includes: a CPU 12 for exerting various controls, such as for controlling recording of image data representing images, for controlling display, and for controlling the respective units forming the device 1; a system memory 14 formed by a ROM that stores basic programs and various coefficients for operating the device 1 and a RAM that provides work area for various processing carried out by the CPU 12; the touch panel-type input unit 18 for allowing the user to input various instructions to the device 1; and the above-described display unit 6.

The order receiving device 1 further includes: a hard disk 24 for storing images read out from the memory card 2 loaded in the card slot 4, various programs carried out by the CPU 12 for print order or image organization and reference data such as organizing conditions; a memory controlling unit 16 for controlling the system memory 14, the card slot 4, the card reader 5 and the hard disk 24; a display controlling unit 26 for controlling display on the display unit 6; an input controlling unit 22 for controlling input through the input unit 18; and a network interface 30 for communication between the device 1 and the printer 8 and the DIC 10 via the network.

It should be noted that, although the single card slot 4 is shown in FIG. 2 for simplicity, the order receiving device 1 includes, in practice, multiple card slots 4 corresponding to various types of memory cards 2.

Processes carried out by the order receiving device 1, which will be described later, are implemented by execution of various programs stored in the hard disk 24. It should be noted that the various programs are stored in the hard disk 24 by installing the programs from a computer-readable recording medium storing the various programs, such as a CD-ROM. The various programs are formed by a main program that controls the overall process carried out in the order receiving device 1 and subprograms that are called, as necessary, by the main program to carry out the ordering process or the image organizing process.

Figure 3:
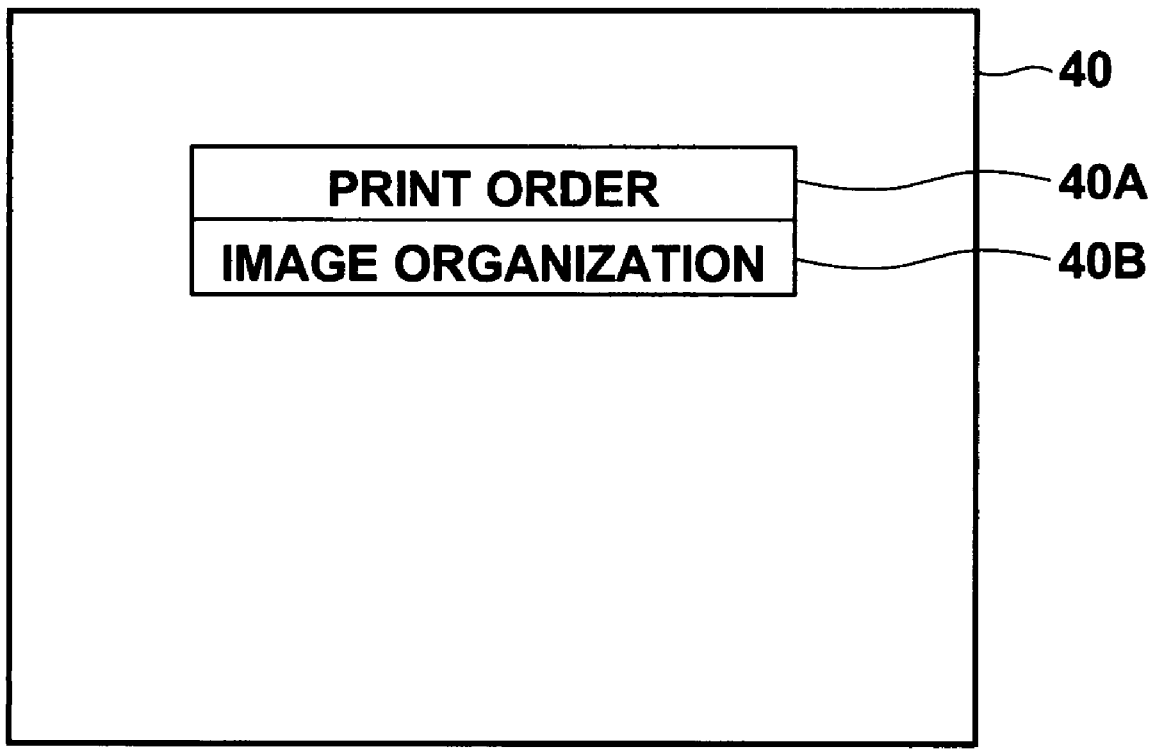
FIG. 3 is a representation of an initial screen.

The print order via the order receiving device 1 is made as follows. FIG. 3 shows an initial screen displayed on the display unit 6 of the order receiving device 1. Display of this screen is controlled by the main program. As shown in FIG. 3, the initial screen 40 includes a print order button 40A for making a print order and an image organization button 40B for carrying out organization of images, as described later. In a case where the user has selected the print order button 40A, the main program calls a print order processing subprogram in the CPU 12, and a process according to this subprogram is carried out. As the user loads, following an instruction displayed on the screen, the memory card 2 storing a plurality of images in the card slot 4, the device 1 reads out the plurality of images from the memory card 2 and temporarily stores the images on the hard disk 24, and displays a list of the images on the display unit 6.

The user selects images to be printed from the list of images displayed on the display unit 6, and sets the number and the size of each print via the touch panel-type input unit 16. As the user instructs execution of printing via the input unit 16, order information indicating the images selected by the user and the number and the size of each print is sent to the DIC 10. Then, image processing necessary for improving image quality is applied to the ordered images, and the images of the number and the size according to the order information are printed and outputted from the printer 8.

Next, the image organizing process according to the embodiment of the invention will be described. This process is implemented by execution of an image organizing subprogram, which is called by the main program when the user has selected the image organization button 40B on the initial screen shown in FIG. 3.

Figure 4:
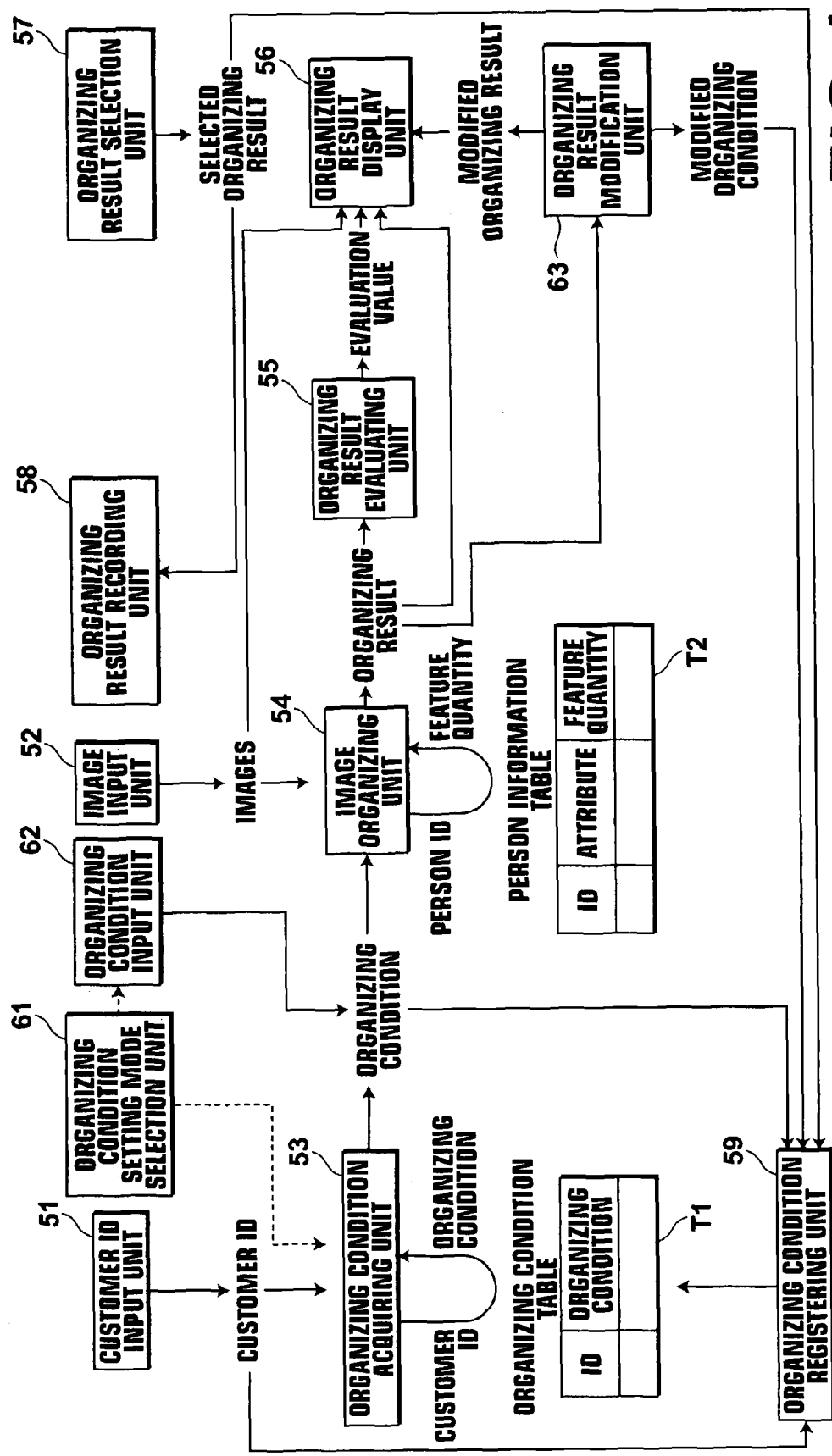
FIG. 4 is a schematic diagram illustrating the main data flow and functional blocks in an image organizing process according to the first embodiment of the invention.

FIG. 4 is a block diagram schematically illustrating the main data flow and functions in the image organizing process according to the first embodiment of the invention. As shown in FIG. 4, the image organizing process is implemented by: a customer ID input unit 51 for acquiring a customer ID; an image input unit 52 for receiving an input of images; an organizing condition setting mode selection unit 61 for receiving a selection of an image organizing condition setting mode; an organizing condition acquiring unit 53 for acquiring, from an organizing condition table T1, an organizing condition associated with the customer ID acquired by the customer ID input unit 51 when the user has selected "automatic" as the organizing condition setting mode; an organizing condition input unit 62 for receiving an input of the organizing condition when the user has selected "manual" as the organizing condition setting mode; an image organizing unit 54 for acquiring a feature quantity of a person from a person information table T2 based on the acquired or inputted organizing condition, as necessary, and carrying out organization of the inputted images; an organizing result evaluating unit 55 for evaluating preferability of each organizing result; an organizing result display unit 56 for causing the display unit 6 to display results of organization of the images based on the result of the evaluation; an organizing result modification unit 63 for receiving a modification on the displayed organizing result; an organizing result selection unit 57 for receiving a selection of the organizing result; an organizing result recording unit 58 for recording the selected organizing result in the memory card 2; and an organizing condition registering unit 59 for registering the organizing condition corresponding to the selected organizing result in the organizing condition table T1.

The customer ID input unit 51 causes the display unit 6 to display a message to prompt the user to load the magnetic card 3 into the card reader 5, such as "Please load the magnetic card". As the magnetic card 3 has been loaded in the card reader 5, the card reader 5 reads the magnetic area of the loaded magnetic card 3 to acquire the customer ID.

The image input unit 52 causes the display unit 6 to display a message to prompt the user to load the memory card 2 into the card slot 4, such as "Please load the memory card". As the memory card 2 has been loaded in the card slot 4, image files are read in from the loaded memory card 2 and are temporarily stored on the hard disk 24 of the device 1.

The organizing condition setting mode selection unit 61 causes the display unit 6 to display an image organizing condition setting mode selection screen. This screen includes a message "Please select a mode for setting an image organizing condition" and buttons for selecting an "automatic" or "manual" mode to receive a selection of "automatic" or "manual" by the user through manipulation of the input unit 18.

As shown in FIG. 8, the organizing condition table T1 contains customer IDs, titles of the organized files, and image organizing conditions including image extracting conditions, image grouping conditions and image sorting conditions, which are registered with being associated with each other so that a single image organizing condition (organizing pattern) can be identified by a combination of the customer ID and a sequential number. That is, multiple image organizing conditions can be associated with one customer ID using different sequential numbers. It should be noted that the customer ID "ZZZ9999" shown in FIG. 8 is not associated with a particular customer. This ID is associated with default organizing conditions of the image organizing device. Specific examples of the image organizing process according to the organizing conditions set in the organizing condition table T1 will be described later.

When the "automatic" organizing condition setting mode has been selected at the organizing condition setting mode selection unit 61, the organizing condition acquiring unit 53 makes random access to the organizing condition table T1 using the customer ID acquired at the customer ID input unit 51 as a search key, and acquires one organizing condition associated with the customer. At this time, the organizing condition acquiring unit 53 stores a position where the organizing condition is acquired (an address of the record in the organizing condition table T1). Therefore, in a case where multiple organizing conditions associated with the customer ID are registered in the organizing condition table T1, the next and the following organizing conditions associated with the customer ID can be read by sequential access from the current reading position in the organizing condition table T1, not by random access.

When the "manual" organizing condition setting mode has been selected at the organizing condition setting mode selection unit 61, the organizing condition input unit 61 causes the display unit 6 to display a screen for setting the organizing condition to receive an input of the organizing condition by the user. FIG. 7 shows one example of the organizing condition setting screen. As shown in FIG. 7, the organizing condition setting screen 41 includes an extracting condition setting area 41A, a grouping condition setting area 41E and a sorting condition setting area 41K.

The extracting condition setting area 41A contains items 41C that can be set in the extracting condition. The user selects the item to be incorporated in the extracting condition by touching a corresponding check box 41B. When the user touches one of set/change buttons 41D, a screen for setting details of the corresponding item is displayed. For example, when the user has touched the set/change button 41D corresponding to the shooting date and time, the organizing condition input unit 61 references associated information of the image files inputted at the image input unit 52, and finds the oldest shooting date and time and the newest shooting date and time, and causes the display unit 6 to display the detail setting screen containing the shooting date and time data within a photographing period of the images in the inputted image files, which is displayed in a form of a calendar. The user sets the extracting condition with respect to the shooting date and time by touching a start point and an end point specifying a photographing period of images to be extracted on the displayed calendar. The organizing condition input unit 61 receives the setting by the user and causes the set photographing period to be displayed at the item position 41C for the shooting date and time in the extracting condition setting area 41A on the organizing condition setting screen 41. When the user has touched the set/change button 41D with respect to the person, the organizing condition input unit 61 sequentially reads the image files inputted at the image input unit 52. Then, face areas are detected from the images and resemblance between the detected faces is determined to group the images containing the faces resembling each other, and a representative face image is determined for each group. The organizing condition input unit 61 causes the display unit 6 to display a detail setting screen containing a list of thumbnail images of the representative faces. The user selects the image of the face that should be contained in the images to be extracted by touching the desired thumbnail image. The organizing condition input unit 61 receives the selection by the user, and causes the thumbnail image of the selected face to be displayed at the item position 41C for the person in the extracting condition setting area 41A on the organizing condition setting screen 41. These operations from detecting the face areas to determining the representative faces can be carried out using known techniques. For example, the face areas may be detected using a method using classifiers obtained through a machine learning process such as Ada-Boost (see, for example, Japanese Unexamined Patent Publication No. 2005-108195). The resemblance between faces may be determined using a method in which feature vectors (feature quantities) representing the position, shape, size, or the like, of feature points such as eyes, nose and/or mouth extracted from each face area are obtained and the face images are grouped based on statistical distances between the feature vectors of the face images (see, for example, Japanese Unexamined Patent Publication No. 1997-251534). The representative faces may be determined using a method in which an image having a most preferable image quality is selected based on edge components, skin color component, and the like, of the face images in each group (see, for example, Japanese Unexamined Patent Publication Nos. 2005-49968 and 2005-122721). It should be noted that the feature quantity of the representative face image of each group is registered in the person information table T2 with being associated with the customer ID acquired at the customer ID input unit 51. Since feature quantities of more than one faces are associated with one customer ID, feature quantity of each face is identified by a person ID formed by a combination of the customer ID and a sequential number. If there is an already registered feature quantity of a face associated with the customer ID, resemblance between the feature quantity of the face to be registered and the feature quantity of the already registered face is determined. If it is determined that the faces resemble each other, no registration is carried out. If it is determined that these faces do not resemble each other, new registration is carried out.

The grouping condition setting area 41E contains a list of items 41F that can be used as grouping keys. The user can select the grouping key by touching a check box 41G corresponding to each item. The user can further set priorities of the grouping keys by touching a "↑"button 41H or a "↓"button 41J corresponding to each item.

Similarly to the grouping condition setting area 41E, the sorting condition setting area 41K contains a list of items 41L that can be used as sorting keys. The user can select the sorting key by touching a check box 41M corresponding to each item, and can set priorities of the sorting keys by touching a "↑"button 41N or a "↓"button 41P corresponding to each item, and can further select the ascending or descending order of sorting by touching an ascending order button 41Q or a descending order button 41R corresponding to each item. It should be noted that selected one of the ascending order button 41Q and the descending order button 41R is highlighted. The organizing condition, which is manually inputted by the user at the organizing condition input unit 61, is stored in a predetermined storage area of the system memory 14 and is used in the organizing process at the image organizing unit 54, which will be described later.

At the image organizing unit 54, based on the acquired/inputted organizing condition (i.e., the extracting condition, the grouping condition and the sorting condition), using the associated information of the inputted images and the feature quantities obtained through analysis of the inputted images as key information for extracting, grouping and sorting the images, and acquiring a feature quantity of a person from the person information table T2, as necessary, an extracting process for extracting images satisfying the extracting condition from the inputted images, a grouping process for grouping the inputted/extracted images into at least one group to satisfy the grouping condition, and a sorting process for sorting the inputted/extracted images or groups generated by the grouping process to satisfy the sorting condition are carried out. It should be noted that each group generated by the grouping process is associated with a logical storage location of the image file, i.e., a folder (directory path).

Specifically, in the image extracting process, if the extracting condition is set to extract, for example, images photographed within a certain set period, the image organizing unit 54 acquires the shooting date and time data recorded in the Exif tag of each of the inputted image files, and extracts only the image files having the shooting date and time within the set period.

In a case where "manual" has been selected at the organizing condition setting mode selection unit 61 and the extracting condition has been set to extract images containing a face of a specific person through the manipulation by the user on the organizing condition setting screen 41 shown in FIG. 7 and other related screens, the image organizing unit 54 uses the results of the operation of face detection, grouping and determination of the representative face image, which have been carried out at the organizing condition input unit 62 according to the setting made by the user touching the set/change button 41D with respect to the person on the organizing condition setting screen 41, to extract the inputted images belonging to the group having the representative face image that matches with the face of the person specified in the extracting condition.

On the other hand, in a case where "automatic" has been selected at the organizing condition setting mode selection unit 61, and the extracting condition acquired from the organizing condition table T1 by the organizing condition acquiring unit 53 is, for example, person ID="ABC0001_01", the image organizing unit 54 accesses the person information table T2 to acquire a feature quantity of the face of the person having this person ID. In the person information table T2, the person ID is associated with attribute information such as the name of the corresponding person and the feature quantity of the face of the person that has been obtained by analyzing the face image of the person. The person ID is formed by a combination of the customer ID and a sequential number. Therefore, multiple persons photographed by one customer can be associated with his or her single customer ID, such that the face of a certain customer having a certain customer ID is associated with the sequential number "00", and the face of his or her child is associated with the sequential number "01". The image organizing unit 54 uses the person ID "ABC0001_01", which is acquired as the extracting condition, as a search key to reference the person information table T2 and acquires a feature quantity of the face associated with the person ID "ABC0001_01". Then, the image organizing unit 54 sequentially reads the image files inputted at the image input unit 52 and detects face areas in the images. Then, feature quantities representing the position, shape, size, and the like, of feature points such as the eyes, nose and mouth in the detected face areas are calculated. Further, statistical distances between the feature quantity of the face associated with the person ID "ABC0001_01" acquired from the person information table T2 and the feature quantities of the respective faces detected from the inputted images are calculated and the inputted images having the calculated statistical distance values not more than a predetermined threshold are extracted.

In a case where the extracting condition is set to extract images photographed at a certain shooting location identified by the GPS information, the image organizing unit 54 acquires the GPS information representing the shooting location recorded in the Exif tag of each of the inputted image files, and calculate, based on the GPS information, a distances between the certain location set as the extracting condition and the shooting location of each inputted image, to extract the inputted images having the calculated distance not more than a predetermined threshold.

Further, in a case where the extracting condition is set to remove defective photos, the following operations may be carried out, for example. Main subject areas, such as faces, in the inputted images are detected and a histogram with respect to the luminance at the main subject area and the background area other than the main subject area is generated for each image. Then, comparison is made between the profile of the generated luminance histogram of each image and a profile of a luminance histogram of an image having an appropriate brightness, which has been registered in advance, and images having the luminance histogram that differ from the luminance histogram of the appropriate image by an amount larger than a predetermined threshold are removed as having inappropriate brightness. To remove out-of-focus images, a main subject in each image is detected, and images having an integration value of high-frequency components in the detected area smaller than a predetermined threshold are removed. To remove blurred images due to movement of the camera, edges in multiple directions are detected from each inputted image, and a histogram with respect to the edge widths obtained for each edge direction is generated. Then, a correlation value between the histograms of the edge widths in two mutually perpendicular directions is obtained for each direction pair. Based on an average edge width in each direction and the correlation value between the histograms of the edge widths of each direction pair, a direction of the larger average edge width of the direction pair, which has the correlation value smaller than a predetermined threshold, is determined as a blur direction. A width of an edge perpendicular to the determined blur direction is used as a blur width (see Japanese Unexamined Patent Publication No. 2005-122721), and images having the blur width larger than a predetermined threshold are removed as blurred images.

It should be noted that images that are not extracted through the extracting process or the removed images are classified in an "unorganized" folder", which is generated separately from folders generated for grouped images in the later-described organizing process.

Next, in the image grouping process, if the grouping condition is set, for example, to group the images with respect to the shooting date and time (year and month), the image organizing unit 54 acquires the shooting date and time recorded in the Exif tag of each inputted image file, and classifies the inputted image files into groups of the respective values of the shooting year and month of the acquired shooting date and time data. It should be noted that the grouping with respect to the shooting date and time may be carried out using, for example, a method where the values of the shooting date and time of the respective images are aligned along the temporal axis, and the images are grouped depending on a magnitude of a shooting interval between each adjacent images having adjacent shooting date and time values (see Japanese Unexamined Patent Publication No. 2000-112997), or a method where a shooting interval between each adjacent images having adjacent shooting date and time values which is larger than a predetermined threshold is used as a boundary between the groups (see Japanese Unexamined Patent Publication No. 2001-228582).

In a case where multiple items such as "shooting year, shooting month, shooting location" are set in the grouping condition, first, the image organizing unit 54 acquires the shooting date and time recorded in the Exif tag of each inputted image file, and classifies the inputted image files into groups of respective values of the shooting year of the acquired shooting date and time data. Then, the image files belonging to each shooting year group are classified into groups of respective values of the shooting month of the acquired shooting date and time data. Finally, the GPS information (latitude and longitude) recorded in the Exif tag and representing the shooting location of each image file belonging to each shooting year and month group is acquired, and the acquired latitudes and longitudes of the respective image files are plotted on a coordinate plane having the ordinate axis representing the latitude and the abscissa axis representing the longitude. This plot is considered as an image (hereinafter referred to as a plotted image). The plotted image is subjected to dilation to form connected regions, and the connected regions are labeled to achieve the grouping (see, for example, Japanese Unexamined Patent Publication No. 2005-49968). The groups classified based on the GPS information may be named such as "shooting location 1", "shooting location 2", and the like, or may be named by place-names acquired from a lookup table associating the GPS information with corresponding place-names, which has been prepared in advance. In this manner, when multiple items are set in the grouping condition, the image organizing unit 54 carries out hierarchical grouping by, first, classifying the inputted image files into groups of respective shooting years, then, classifying the image files belonging to each shooting year group into groups of respective shooting months, and classifying the image files belonging to each shooting year and month group into groups of respective shooting locations.

In a case where the grouping condition is set to group the images for each person, similarly to the operation carried out at the organizing condition input unit 61 when the set/change button 41D with respect to the person is touched by the user, the image organizing unit 54 sequentially reads image files inputted at the image input unit 52, detects face areas in the images, determines resemblance between the detected faces, and groups the face images resembling each other. It should be noted that the feature quantity of the representative face image of each group generated by the grouping is associated with the customer ID acquired at the customer ID input unit 51 and registered in the person information table T2. Since feature quantities of more than one faces are associated with one customer ID, the feature quantity of each face is identified by a combination of the customer ID+a sequential number. If there is an already registered feature quantity of a face associated with the customer ID, resemblance between the feature quantity of the face to be registered and the feature quantity of the already registered face is determined. If it is determined that the faces resemble each other, no registration is carried out. On the other hand, if it is determined that the faces do not resemble each other, new registration is carried out. In a case where the user has touched the set/change button 41D with respect to the person on the organizing condition setting screen 41 and grouping of the faces similar to that described above has already been carried out at the organizing condition input unit 62, the results thereof can be used.

In a case where the grouping condition is set to classify the images with respect to the event of the scenes in the images, the image organizing unit 54 obtains, for example, multiple types of integrated feature quantities based on feature quantities which are obtained by multiple types of image analysis applied to the inputted images, and selects one of the integrated feature quantities, which exhibits high positive correlation between "an amount of change in the integrated feature quantity between adjacent images" and "a shooting date and time interval between the adjacent images", as an event feature quantity that best represents the events of the scenes in the inputted images. Then, grouping is carried out according to the distribution of values of the selected event feature quantity.

Specifically, first, the image organizing unit 54 applies multiple types of image analysis to each of the inputted image files to calculate multiple types of feature quantities $g_i$ (i=1, 2, ..., n, ..., N). The feature quantities to be calculated include, for example, those representing color, luminance, texture and/or depth of the images and edges in the images. Subsequently, M types of integrated feature quantities $Ev(j)$ are calculated based on the multiple feature quantities $g_i$ and multiple coefficients $a_i[j]$, $b_i[j]$, $c_i[j]$ ($j=1, 2, \ldots, m, \ldots, M$), as shown by formula (1) below, for example:

$$Ev[j] = (a_1[j] \cdot g_1 + a_2[j] \cdot g_2 + \ldots + a_N[j] \cdot g_N) + \\ (b_1[j] \cdot g_1 \cdot g_2 + b_2[j] \cdot g_2 \cdot g_3 + \ldots + b_{N-1}[j] \cdot g_{n-1} \cdot g_n) + \\ (c_1[j] \cdot g_1^2 + c_2[j] \cdot g_2^2 + \ldots + c_N[j] \cdot g_n^2) \quad (1)$$

Thus, M integrated feature quantities $Ev[j]$ are obtained for different combinations of values of the coefficients $a_i[j]$, $b_i[j]$, $c_i[j]$ for one inputted image.

Further, a correlation coefficient $R[j]$ between "a shooting time interval $\Delta t$ between each adjacent images of the inputted images sorted in the order of the shooting date and time" and "a difference $\Delta Ev[j]$ in the integrated feature quantity between each adjacent images" is found for each case where $j=1, 2, \ldots, m, \ldots, M$. Then, from the integrated feature quantities $Ev[j]$, an integrated feature quantity $Ev[J]$, having the value of j being a value J, at which the correlation coefficient $R[j]$ becomes the maximum, is determined to be used as the event feature quantity.

Then, the inputted images are sorted in the order of the values of the event feature quantity $Ev[J]$ of the respective images. If a difference in the event feature quantity $Ev[J]$ between certain adjacent images is larger than a predetermined threshold, a group boundary for grouping the inputted images is set between these images.

Figure 9A:
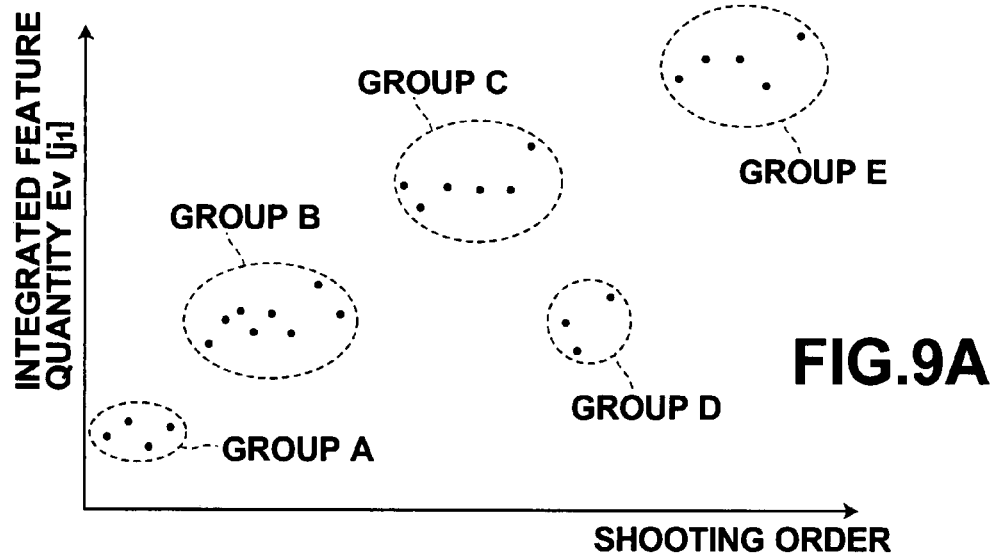
FIGS. 9A to 9C are graphs illustrating the nature of integrated feature quantities.
Figure 9B:
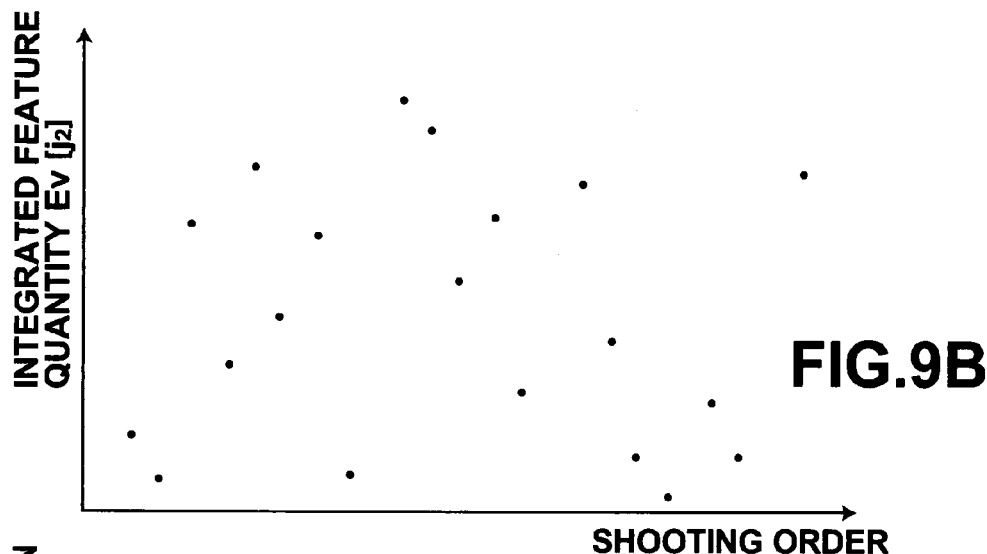
Figure 9C:
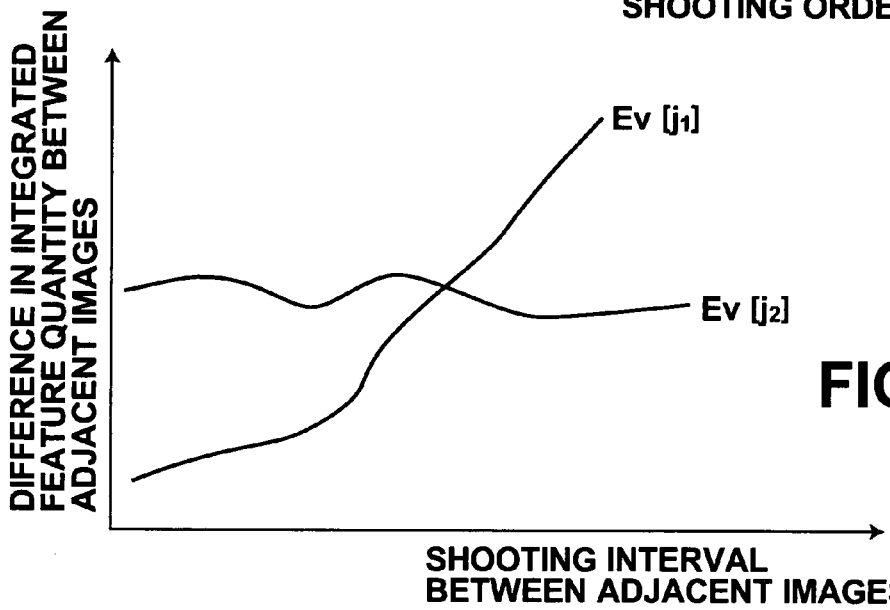

For example, assuming that, for a certain integrated feature quantity $Ev[J_1]$, a time-series distribution is expressed by plotting the values of the integrated feature quantity $Ev[J_1]$ of the respective inputted images with the ordinate axis representing the integrated feature quantity and the abscissa axis representing the shooting order, and groups A to E, each containing successive images, are formed, as shown in FIG. 9A. Then, the integrated feature quantity $Ev[J_1]$ is regarded as being preferable for grouping the inputted images. In contrast, if a similar time-series distribution is plotted with respect to another integrated feature quantity $Ev[J_2]$, and a random distribution is observed as shown in FIG. 9B, the integrated feature quantity $Ev[J_2]$ is regarded as being not preferable for grouping the inputted images. In the above-described classifying method, it is assumed that "if a shooting interval between certain adjacent images is large, it is highly likely that the images contains scenes of different events" for discerning between these distribution patterns. Therefore, when a certain integrated feature quantity exhibits the highest positive correlation between "a difference in the integrated feature quantity between each adjacent images" and "a shooting interval between the adjacent images of the inputted images", which are sorted in the time-series order, the integrated feature quantity is selected as the most suitable event feature quantity for grouping the inputted images with respect to the event of the scenes, and the inputted images are grouped according to the distribution of the values of the selected event feature quantity. It should be noted that, in the case shown in FIG. 9A, the groups B and D are regarded as the same group in the result of grouping according to the event feature quantity $Ev[J_1]$. For example, if the group B contains images of the athletic meet held in the last year and the group D contains images of the athletic meet held in this year, these two groups are integrated into one "athletic meet" group.

In the image sorting process, if the sorting condition is set, for example, to sort the images in the ascending order with respect to the shooting date and time, the image organizing unit 54 acquires the shooting date and time data recorded in the Exif tag of each inputted image file, and sorts the images belonging to each group generated by the grouping process in the ascending order with respect to the shooting date and time. If the grouping has been carried out with respect to the shooting date and time, the order of the generated groups are also sorted with respect to the shooting date and time.

The result of the above-described organization carried out at the image organizing unit 54 may be presented in a form of a list, where file names of the extracted images are associated with names of the groups (folder names) to which the respective image files belong, and the image files are sorted based on the sorting condition.

The organizing result evaluating unit 55 calculates evaluation values $Sc[k]$ ($k=1, 2, \ldots, K$), each of which indicates preferability of the result of corresponding one of the multiple types of (K types of) organizing processes carried out at the image organizing unit 54. The evaluation value $Sc[k]$ can be obtained by determining, for each organizing result, an evaluation score ranging from 0 to 5 based on a predetermined evaluation criteria for each of evaluation items (such as the number of groups generated by the organizing process, the number of images in each group and/or deviation (variance) of the numbers of images in the respective groups), and summing up the evaluation scores for the evaluation items. As the predetermined evaluation criteria, for example, since it may not be appropriate to have a too large or too small number of classified groups, the evaluation score of 5 may be given to the result if the number of the classified groups is within a predetermined range of values, and a lower evaluation score may be given to the result having the number of the classified groups out of the range, such that the larger the deviation, the lower the score. Also, it may not be appropriate to have a too large or too small number of images in one group. Therefore, similarly to the number of groups, the evaluation score of 5 may be given to the result if the average number of images per group is within a predetermined range of values, and a lower evaluation score may be given to the result having the number of images per group out of the range, such that the larger the deviation, the lower the score. With respect to the deviation of the numbers of images in the respective groups, smaller deviation may be more appropriate. Therefore, a variance of the numbers of images in the respective groups is found, and if the variance value is smaller than a predetermined value, the evaluation score of 5 may be given to the result, and a lower evaluation score may be given to the result having a larger variance value, such that the larger the variance, the lower the score.

Based on the evaluation values $Sc[k]$ calculated at the organizing result evaluating unit 55, the organizing result display unit 56 sets display priority of the organizing results in the order of the evaluation values from the highest, and a predetermined number of organizing results are sequentially displayed on the display unit 6 from the one having the highest priority. FIG. 10 shows one example of the organizing result display screen displaying the organizing result. As shown in FIG. 10, the organizing result display screen 42 includes: a title area 42A for displaying a display priority of the organizing result and the title of the organization; a folder area 42B for displaying folders generated through the grouping at the image organizing unit 54; a thumbnail image area 42C for reading in the image files in the folder selected by the user in the folder area 42B and displaying thumbnail images thereof; a "Previous organizing result" button 42D for causing the previous organizing result, i.e., the organizing result having the higher priority, to be displayed; a "Next organizing result" button 42E for causing the next organizing result, i.e., the organizing result having the lower priority, to be displayed; a "View organizing condition" button 42F for causing the organizing condition corresponding to the currently displayed organizing result to be displayed on a separate screen; an "Edit title" button 42G for causing a screen for edition of the title of the currently displayed organizing result to be displayed; a "Remove folder" button 42H for removing a classified group represented by a folder selected by the user; a "Remove file" button 42J for removing an image selected by the user from the folder to which the image belongs to; a "Remove defective photos" button 42K for removing defective photos, such as blurred and out-of-focus images from the images in each folder; a "Use this organizing result" button 42L for fixing the condition for organizing the inputted images to the condition corresponding to the currently displayed organizing result; and an "End" button 42M for terminating the operation in the image organization menu.

It should be noted that the "organizing result "n"" displayed in the title area 42A indicates that the displayed organizing result has the n-th priority, i.e., has the n-th highest evaluation value Sc[k]. The displayed title, "Taro Fuji's Growth Record (January 2005-February 2006)", is acquired from the item "title" in the organizing condition table T1 or is inputted by the user on the title edition screen, which is displayed when the user has touched the title edit button 42G. It should be noted that the person name (Taro Fuji) used in the title may be registered as a variable "NAME", not as a fixed value, in the organizing condition table T1, and the name of the person corresponding to the person ID specified in the extracting condition may be acquired from the person information table T2. Similarly, the year and the month may be registered as a variable such as "MM/YY-1" and "MM/YY-2", and the minimum value and the maximum value of the shooting date and time of the extracted images may be acquired from the Exif tags of the image files.

In the folder area 42B, a visualization of the classification hierarchy of the folders is displayed based on information of the names of the folders, to which the files in the list of the organizing result belong.

The organizing result modification unit 63 carries out modification on the organizing result according to the user touching any of the "Edit title" button 42G, the "Remove folder" button 42H, the "Remove file" button 42J and the "Remove defective photos" button 42K.

Specifically, when touch by the user on the "Edit title" button 42G is detected, the title edition screen is displayed on the display unit 6. The title edition screen includes a user interface for allowing the user to select a title from preset typical titles and a user interface for allowing the user to freely input a title using character buttons for inputting kana, alphabet, or other characters. The title selected or inputted on this screen is displayed in the title area 42A on the organizing result display screen 42. The title edition screen further includes a user interface for allowing the user to input attributes, such as a name of a person, with respect to the face image of the person specified in the extracting condition or the face image of the person corresponding to each group generated under the grouping condition set to group the images with respect to the person. The inputted attributes of the person is associated with the person ID together with the feature quantity of the face of the person and is registered in the person information table T2.

When it is detected in the folder area 42B on the organizing result display screen 42 that the user has touched and selected a folder to be removed and further has touched the "Remove folder" button 42H, rows in the organizing result list containing the files associated with the selected folder to be removed are deleted, and all the image files belonging to the selected folder to be removed are moved to the "unorganized" folder. The removing operation carried out here is equal to an operation to extract only the image files belonging to the folders that are not to be removed. Therefore, this removing operation is reflected as the extracting condition. For example, if a folder corresponding to a person ID "DEF0001_05" is removed from folders classified for respective persons (person IDs "DEF0001_00" to "DEF0001_05"), since this operation is equal to extracting images containing faces of persons corresponding to the person IDs "DEF0001_00" to "DEF0001_04", an extracting condition for extracting the images corresponding to the person IDs "DEF0001_00" to "DEF0001_04" is added to the extracting condition.

When it is detected in the thumbnail image area 42C on the organizing result display screen 42 that the user has touched and selected an image to be removed and further has touched the "Remove file" button 42J, a raw containing the selected file to be removed is deleted from the list of the organizing result, and the selected image file to be removed is moved to the "unorganized" folder.

When it is detected that the user has touched the "Remove defective photos" button 42K, the same operation as the operation for removing defective photos at the image organizing unit 54 is carried out, and the image files determined as being defective photos are moved to the "unorganized" folder.

When it is detected that the user has touched the "Use this organizing result" button 42L on the organizing result display screen 42, the organizing result selection unit 57 identifies the organizing result displayed on the organizing result display screen 42 when the user touched the "Use this organizing result" button 42L and the organizing condition corresponding to the organizing result.

The organizing result recording unit 58 records, in the memory card 2 loaded in the card slot 4, the organizing result list corresponding to the organizing result identified at the organizing result selection unit 57.

The organizing result registering unit 59 associates the organizing condition corresponding to the organizing result identified at the organizing result selection unit 57 with the customer ID acquired at the customer ID input unit 51 and registers the organizing condition in the organizing condition table T1. If there is an already registered organizing condition associated with the customer ID, then, whether or not the same organizing condition as the current organizing condition has been registered is checked. If the same organizing condition has already been registered, no registration is carried out. If not, the current organizing condition is registered under a new sequential number, which is obtained by incrementing the maximum value of the sequential numbers already associated with the customer ID by one.

Next, outline of the flow of the image organizing process according to the embodiment of the invention will be described with reference to a flow chart shown in FIGS. 5 and 6 and an example of registration in the organizing condition table T1 shown in FIG. 8.

As the first case, a description is made on a case where a user having a customer ID "ABC0001" manually sets an organizing condition to organize images of his or her child as a growth record, in a state where no organizing condition associated with the customer ID "ABC0001" is registered in the organizing condition table T1 shown in FIG. 8.

As the user selects the image organization button 40B on the initial screen shown in FIG. 3, the customer ID input unit 51 causes the display unit 6 to display a message "Please load the magnetic card". As the user loads the magnetic card 3 in the card reader 5, the customer ID input unit 53 reads the magnetic card 3 loaded in the card reader 5 and acquires the customer ID "ABC0001" (step S1).

Then, the image input unit 52 causes the display unit 6 to display a message "Please load the memory card". As the user loads the memory card 2 in the card slot 4, the image input unit 52 reads in image files of a plurality of images from the memory card 2 loaded in the card slot 4 and temporarily stores the image files on the hard disk 24 (step S2).

As the customer ID and the images have been input, the organizing condition setting mode selection unit 61 causes the display unit 6 to display the image organizing condition setting mode selection screen. In this first case, the user touches the "Manual" button on the image organizing condition setting mode selection screen to select the manual organizing condition setting mode (step S3).

In response to the selection of the "manual" organizing condition setting mode (step S4: NO), the organizing condition input unit 61 causes the display unit 6 to display the organizing condition setting screen 41. When the user touches the set/change button 41D with respect to the person in the extracting condition setting area 41A, the organizing condition input unit 61 carries out face detection on the images inputted at the image input unit 52, grouping of the face images resembling each other, and determination of a representative image of each group. Then, the organizing condition input unit 61 causes the display unit 6 to display a detail setting screen containing a list of thumbnail images of faces contained in the inputted images. Further, the organizing condition input unit 61 associates the feature quantity of the representative image of each group with the customer ID acquired at the customer ID input unit 51, and registers the feature quantity of the representative image in the person information table T2. When the user touches and selects a thumbnail image of the face of his or her child to be organized among the displayed thumbnail images of faces, the organizing condition input unit 61 causes the thumbnail image of the selected face to be displayed in the area for displaying the extracting condition with respect to the person in the extracting condition setting area 41A, and also causes a check mark to be displayed in a checkbox with respect to the person. The user further selects key items for grouping by touching the check boxes 41G with respect to the shooting year and the shooting month in the grouping condition setting area 41E, and changes the order of the key items for grouping, as necessary, by touching the arrow button 41H or 41J so that the classification hierarchy is set in the order of the shooting year and the shooting month. The user further selects key items for sorting by touching the check boxes 41M with respect to the shooting year, the shooting month, the shooting date and the shooting time in the sorting condition setting area 41K, and changes the order of the key items for sorting, as necessary, by touching the arrow button 41H or 41J, so that the priority of the key items for sorting is set in the order of the shooting year, the shooting month, the shooting date and the shooting time, and selects the ascending order of sorting by touching the ascending order button 41Q. The image organizing condition, which is manually inputted through the manipulation by the user as described above, is stored by the organizing condition input unit 62 in a predetermined storage area in the system memory 14 (step S22).

The image organizing unit 54 extracts images containing the face of the specified user's child from the inputted images based on the organizing condition inputted at the organizing condition input unit 62. Then, the image organizing unit 54 determines, for each extracted image, which folder of the folders for the respective shooting years and months the image belongs to, to hierarchically classify the images with respect to the shooting year and the shooting month. Then, the image organizing unit 54 determines the sorting order of the image files in the organizing result list so that the classified folders are sorted in the ascending order with respect to the shooting year and the shooting month, and the files in each folder for each shooting month are sorted in the ascending order with respect to the shooting date and time (step S23).

The organizing result display unit 56 causes the display unit 6 to display the organizing result display screen 42 (see FIG. 10) representing the result of organization by the image organizing unit 54 (step S14).

At this time, the user checks the displayed organizing result and touches the "Edit title" button 42G (step S15: YES). In response to the user touching the "Edit title" button 42G, the organizing result modification unit 63 causes the display unit 6 to display the title edition screen. The user selects "(NAME)'s Growth Record ((MM/YY-1)-(MM/YY-2))" from the typical titles, and inputs a person name (Taro Fuji) corresponding to the face image of his or her child selected as the extracting condition (step S21). Thus, as shown in FIG. 10, the title of the organization, "Taro Fuji's Growth Record (January 2005-February 2006)", is displayed in the title area 42A on the organizing result display screen 42 (step S14). The person name "Taro Fuji" inputted at this time by the user is associated with the same person ID associated with the feature quantity of the face image of his or her child selected as the extracting condition, and is registered in the person information table T2.

When the operation for editing the title and modifying the organizing result has been completed and no further modification has been made (step S15: NO), and the user has touched the "Use this organizing result" button 42L on the organizing result display screen 42 (step S16: YES), the organizing result selection unit 57 identifies the organizing result displayed on the organizing result display screen 42 and the organizing condition corresponding to the displayed organizing result.

Then, the organizing result recording unit 58 records the list of the identified organizing result in the memory card 2 loaded in the card slot 4 (step S17).

The organizing condition registering unit 59 acquires, from the organizing condition table T1, already registered organizing conditions associated with the customer ID "ABC0001" inputted at the customer ID input unit 51 (step S18), and determines whether or not the currently identified organizing condition overlaps with any of the already registered organizing conditions (step S19). Since it is assumed in this first case that no organizing condition associated with the customer ID "ABC0001" is registered in the organizing condition table T1, it is determined that there is no overlapping organizing condition (step S19: NO). Then, the organizing condition registering unit 59 associates the current organizing condition with the customer ID "ABC0001" and a sequential number "01" and registers the current organizing condition in the organizing condition table T1 (step S20). Thus, the title, the extracting condition, the grouping condition and the sorting condition of the organization associated with the customer ID "ABC0001" and the sequential number "01" have been registered in the organizing condition table T1 of the example shown in FIG. 8.

It should be noted that if the user touches the "End" button 42M on the organizing result display screen 42 (step S16: NO), recording of the organizing result and registration of the organizing condition are not carried out, and the initial screen 40 is displayed.

Next, as the second case, a description is made on a case where the organizing condition associated with the customer ID "ABC0001" and the sequential number "01" has already been registered in the organizing condition table T1 through the above-described process carried out at the previous time, and images newly photographed by the user having the customer ID "ABC0001" are organized as the growth record of his or her child in the manner similar to that described above.

As described above, the image organization button 40B is selected, the magnetic card 3 is loaded, the customer ID is acquired (step S1), the memory card 2 is loaded and the images are inputted (step S2). Then, the organizing condition setting mode selection unit 61 causes the display unit 6 to display the image organizing condition setting mode selection screen. As the user touches the "Automatic" button on the image organizing condition setting mode selection screen, the automatic organizing condition setting mode is selected (step S3).

In response to the selection of the "automatic" organizing condition setting mode (step S4: YES), the organizing condition acquiring unit 53 references the organizing condition table T1 by using the customer ID and the sequential number "01" inputted at the customer ID input unit 51 as search keys (step S5), and acquires, from the organizing condition table T1, the first organizing condition (associated with the sequential number "01") of the organizing conditions associated with the customer ID "ABC0001" (step S6: YES).

Based on the acquired extracting condition "person ID="ABC0001_01"", the image organizing unit 54 detects face areas from the images inputted at the image input unit 52 and obtains feature quantities of the faces, and the image organizing unit 54 also acquires a feature quantity associated with the person ID "ABC0001_01" from the person information table T2. Then, a statistical distance between the feature quantity associated with the person ID "ABC0001_01" and the feature quantity of each detected face is calculated. Then, inputted images having the calculated statistical distance not more than a predetermined threshold are extracted. The extracted images are hierarchically classified with respect the shooting year and the shooting month based on the grouping condition "shooting date and time (YY), shooting date and time (MM)" and the shooting date and time in the associated information of each of the extracted images, and are sorted in the order of the shooting date and timebased on the sorting condition "shooting date and time, ascending order" (step S7).

As the image organizing process based on the first organizing condition has been completed as described above, the organizing condition acquiring unit 53 increments the value of the sequential number by one to "02", and attempts to acquire the second organizing condition associated with the customer ID "ABC0001" (step S8). Since only one organizing condition associated with the customer ID "ABC0001" is registered in this second case, no second organizing condition is found (step S9: NO). Then, a user interface for allowing the user to select whether or not to continue the image organization using device's default organizing conditions is displayed on the display unit 6 (step S10).

In this second case, the user selects not to carry out the image organization using the default organizing conditions, and therefore the image organizing process using the default organizing conditions is skipped (step S10: NO). Then, determination is made as to whether or not only a single pattern of organizing process has been carried out (step S12). In this second case, only the single pattern of organizing process has been carried out under the organizing condition associated with the customer ID "ABC0001" and the sequential number "01" (step S12: YES). Therefore, the organizing result display unit 56 causes the display unit 6 to display the organizing result display screen 42 (see FIG. 10) representing the organizing result under this organizing condition (step S14). It should be noted that the name "Taro Fuji" in the title area 42A on the organizing result display screen 42 has been acquired by the organizing result display unit 56 from the person information table T2, which contains the name associated with the person ID "ABC0001_01", which is specified in the extracting condition.

Thereafter, as described above, the organizing result is modified as necessary (steps S15 and S21), and when the user touches the "Use this organizing result" button 42L on the organizing result display screen 42 (step S16: YES), the organizing result selection unit 57 identifies the organizing result displayed on the organizing result display screen 42 and the organizing condition corresponding to the organizing result. Then, the organizing result recording unit 58 records the list of the identified organizing result in the memory card 2 (step S17).

The organizing condition registering unit 59 acquires, from the organizing condition table T1, organizing conditions, which have already been registered in the organizing condition table T1, associated with the customer ID "ABC0001" inputted at the customer ID input unit 51 (step S18), and determines whether or not the currently identified organizing condition overlaps with any of the already registered organizing conditions (step S19). In this second case, the organizing condition already registered in the organizing condition table T1 and associated with the customer ID "ABC0001" and the sequential number "01" is acquired, and is compared with the current organizing condition. If the user has not carried out modification on the organizing result that influences the organizing condition, it is determined that there is an overlapping organizing condition (step S19: YES), and the current organizing condition is not registered. If the user has modified the organizing result and the organizing condition has been changed, it is determined that there is no overlapping organizing condition (step S19: NO), and the current organizing condition is associated with the customer ID "ABC0001" and the sequential number "02" and is registered in the organizing condition table T1 (step S20).

As the third case, a description is made on a case where only the organizing condition associated with the customer ID "ABC0001" and the sequential number "01" has been registered in the organizing condition table T1 through the process described above in the first case, and the user having the customer ID "ABC0001", who is not sure about the contents of the images stored in another memory card 2, selects to carry out the organization of images according to organizing conditions that are automatically set by the device 1, not by setting the organizing condition by himself or herself.

As described above, the image organization button 40B is selected, the magnetic card 3 is loaded and the customer ID is acquired (step S1), and the memory card 2 is loaded and the images are inputted (step S2). Then, the organizing condition setting mode selection unit 61 causes the display unit 6 to display the image organizing condition setting mode selection screen. As the user touches the "Automatic" button on the image organizing condition setting mode selection screen, the automatic organizing condition setting mode is selected (step S3).

In response to the selection of the "automatic" organizing condition setting mode (step S4: YES), the organizing condition acquiring unit 53 references the organizing condition table T1 using the customer ID and the sequential number "01" inputted at the customer ID input unit 51 as the search keys (step S5), and acquires, from the organizing condition table T1, the first organizing condition (associated with the sequential number "01") of the organizing conditions associated with the customer ID "ABC0001" (step S6: YES).

The image organizing unit 54 carries out the image organizing process based on the acquired organizing condition (step S7). In this third case, a result of the n-th image organizing process is referred to as the n-th organizing result. Therefore, the result of the organization under the organizing condition associated with the customer ID "ABC0001" and the sequential number "01" is referred to as the first organizing result.

As the image organizing process based on the first organizing condition has been completed, the organizing condition acquiring unit 53 increments the value of the sequential number by one to "02", and attempts to acquire the second organizing condition associated with the customer ID "ABC0001" (step S8). Since only one organizing condition associated with the customer ID "ABC0001" is registered in this case, no second organizing condition is found (step S9: NO). Then, the user interface for allowing the user to select whether or not to continue the image organization using the device's default organizing conditions is displayed on the display unit 6 (step S10).

In this third case, the user selects to carry out the image organization using the default organizing conditions (step S10: YES). Then, the organizing condition acquiring unit 53 and the image organizing unit 54 carry out an image organizing process using the default organizing conditions (step S11). Specifically, the organizing condition acquiring unit 53 sets the customer ID to "ZZZ9999", which is a value reserved for the default organizing conditions, and sets the sequential number to "01" to reference the organizing condition table T1 and acquire the first organizing condition of the default organizing conditions from the organizing condition table T1. Then, the image organizing unit 54 carries out the image organizing process based on the acquired default organizing condition. The organizing condition acquiring unit 53 repeats the operation to increment the sequential number by one and acquire the next default organizing condition, and the image organizing unit 54 repeats the operation to carry out the image organizing process based on the acquired default organizing condition.

In the case of the organizing condition table T1 shown in FIG. 8 (it should be noted that the organizing condition associated with the customer ID "ABC0001" and the sequential number "02" has not yet been registered at this point), four patterns of image organizing results are obtained through the above-described image organizing process, including the first organizing result based on the organizing condition associated with the customer ID "ABC0001" and the sequential number "01", the second organizing result based on the organizing condition associated with the customer ID "ZZZ9999" and the sequential number "01", where the images are hierarchically classified with respect to the person ID, the shooting year and the shooting month and are sorted in the ascending order with respect to the shooting date and time, the third organizing result based on the organizing condition associated with the customer ID "ZZZ9999" and the sequential number "02", where the images are hierarchically classified with respect to the shooting year, the shooting month and the shooting location and are sorted in the ascending order with respect to the shooting date and time, and the fourth organizing result based on the organizing condition associated with the customer ID "ZZZ9999" and the sequential number "03", where the images are classified according to a distribution of the event feature quantities and are sorted in the ascending order with respect to the shooting date and time. It should be noted that the person ID in the second organizing result indicates, as described above, that the face images detected from the inputted images are grouped based on resemblance therebetween, and a feature quantity of a representative face image of each group generated by the grouping operation is associated with a person ID and registered in the person information table T2.

As described above, the multiple patterns of organizing processes have been carried out in this third case (step S12: NO). Therefore, the organizing result evaluating unit 55 calculates, for the respective organizing results, evaluation values Sc[1] to Sc[4], each representing preferability of the corresponding organizing result, by taking the number of groups, the number of images in each group, deviation (variance) of the numbers of images in the respective groups, and the like, into account (step S13).

The organizing result display unit 56 sorts the organizing results in the descending order of the values of the evaluation values Sc[1] to Sc[4], which order represents display priority of the organizing results, and causes the display unit 6 to display the organizing result display screen 42 containing the organizing result having the highest evaluation value (the highest priority) as the organizing result 1 (step S14). When the user touches the "Next organizing result" button 42E on the organizing result display screen 42, the organizing result display unit 56 causes the display unit 6 to display the organizing result display screen 42 containing the organizing result having the second highest evaluation value as the organizing result 2. The organizing results 3 and 4 can be displayed in the similar manner. When the user touches the "Previous organizing result" button 42D on the organizing result display screen 42, the organizing result display unit 56 causes the display unit 6 to display the organizing result display screen 42 containing the organizing result that has a priority higher by one than the currently displayed organizing result.

Then, as described above, the organizing result is modified as necessary (step S15, S21), and when the user touches the "Use this organizing result" button 42L (step S16: YES) in a state where the organizing result (in this example, the fourth organizing result), which is determined by the user as being the most preferable, is displayed on the organizing result display screen 42, the organizing result selection unit 57 identifies the organizing result displayed on the organizing result display screen 42 and the organizing condition corresponding to the organizing result. Then, the organizing result recording unit 58 records the list of the identified organizing result in the memory card 2 (step S17).

The organizing condition registering unit 59 acquires, from the organizing condition table T1, already registered organizing conditions associated with the customer ID "ABC0001" inputted at the customer ID input unit 51 (step S18), and determines whether or not the currently specified organizing condition overlaps with any of the already registered organizing conditions (step S19). In this third case, the organizing condition associated with the customer ID "ABC0001" and the sequential number "01", which has already been registered in the organizing condition table T1, differs from the organizing condition selected by the user, i.e., the organizing condition associated with the customer ID "ZZZ9999" and the sequential number "03", which groups the images according to the event feature quantities and sorts the classified images in the ascending order with respect to the shooting date and time. Therefore, it is determined that there is no overlapping organizing condition (step S19: NO), and the selected organizing condition is associated with the customer ID "ABC0001" and the sequential number "02" and is registered in the organizing condition table T1 (step S20). It should be noted that the example of registration entry associated with the customer ID "ABC0001" and the sequential number "02" shown in FIG. 8 represents a case where the user has touched the "Edit title" button 42G on the organizing result display screen 42 and the title "Athletic Meet" has been inputted (steps S15 and S21, at the organizing result modification unit 63).

Similarly, as the fourth case, in a case where the user having the customer ID "ABC0001" carries out organization of new images under the automatically set organizing conditions, two organizing results based on the two organizing conditions associated with the customer ID "ABC0001", which have already been registered in the organizing condition table T1, are obtained through the operations by the organizing condition acquiring unit 53 and the image organizing unit 54 in the above-described steps S5 to S9. Then, if the user selects not to carry out the image organization under the default organizing conditions (step S10: NO), the organizing result evaluating unit 55 calculates evaluation values Sc[1] and Sc[2] for the two organizing results (step S13), and the organizing result display unit 56 causes the display unit 6 to display the organizing result display screen 42 which displays these organizing results as the organizing results 1 and 2 in the order of the evaluation values from the highest (step S14). In this manner, when the multiple organizing conditions associated with the customer ID are registered in the organizing condition table T1, the organizing results based on these organizing conditions can be evaluated and displayed, as similarly to the third case.

Now, an operation for reflecting the modification on the organizing result made by the user in the organizing condition will be explained. For example, in a case where a user having the customer ID "DEF0001" wishes new images to be organized under the automatically set organizing conditions, in a state where no organizing condition associated with the customer ID is registered in the organizing condition table T1, the user selects to carry out the organization under the default organizing conditions in step S10. Then, the organizing condition acquiring unit 53 sequentially acquires three organizing conditions associated with the customer ID "ZZZ9999" from the organizing condition table T1, and the image organizing unit 54 carries out the image organizing process based on the three organizing conditions, respectively, to obtain three organizing results (step S11). Subsequently, the organizing result evaluating unit 55 calculates the evaluation values Sc[1] to Sc[3] for the respective organizing results (step S13). Then, the organizing result display unit 56 causes the display unit 6 to display the organizing result display screen 42 which displays the organizing results 1, 2 and 3 in the order of the evaluation values from the highest (step S14). In a case where the images are classified into six folders respectively corresponding to person IDs "DEF0001_00" to "DEF0001_05", as the result of the image organizing process based on the organizing condition associated with the customer ID "ZZZ9999" and the sequential number "01", when the user touches the folder corresponding to the person ID "DEF0001_05" in the folder area 42B to select the folder and further touches the "Remove folder" button 42H, the folder corresponding to the person ID "DEF0001_05" is moved to the "unorganized" folder, and is deleted from the organizing result display screen 42. When the user touches the "Remove defective photos" button 42K, images that are determined as being defective photos among the images classified in each folder through the above-described operation are moved to the "unorganized" folder, and are deleted from the organizing result display screen 42. If the user is satisfied by this organizing result and touches the "Use this organizing result" button 42L (step S16: YES), the organizing result selection unit 57 identifies the organizing result displayed on the organizing result display screen 42 and the organizing condition corresponding to the organizing result. Then, the organizing result recording unit 58 records the list of the identified organizing result in the memory card 2 (step S17). Then, the organizing condition registering unit 59 checks overlap between the current organizing condition and the already registered organizing conditions (steps S18 and S19), and if there is no overlapping organizing condition, the organizing condition registering unit 59 registers the current organizing condition in the organizing condition table T1 (step S20). Comparing the registered organizing condition associated with the customer ID "DEF0001" and the sequential number "01" with the default organizing condition associated with the customer ID "ZZZ9999" and the sequential number "01", which corresponds to the organizing result before the modification for generating the organizing condition associated with the customer ID "DEF0001" and the sequential number "01", shown in the organizing condition table T1 in FIG. 8, it can be seen that the newly registered organizing condition includes the extracting condition "person ID="DEF0001_00"-"DEF0001_04"" and the extracting (excluding) condition "remove defective photos". This indicates that the modification on the organizing result made by user's manipulation on the organizing result display screen 42 has been identified by the organizing result selection unit 57 and reflected in the organizing condition.

As described above, in the image organizing process according to the first embodiment of the invention, the organizing conditions used for the past image organizing operations are stored in the organizing condition table T1 with being associated with the customer ID of the user. When the user selects the automatic organizing condition setting mode at the organizing condition setting mode selection unit 61, the organizing condition acquiring unit 53 acquires, from the organizing condition table T1, the organizing conditions associated with the customer ID inputted at the customer ID input unit 51, and the image organizing unit 54 carries out organization of the new images inputted at the image input unit 52 based on each of the acquired organizing conditions. Therefore, automatic organization of images, which meets the point of view of organization desired by the user and therefore is more preferable to the user than the conventional image organization using a uniform organizing condition for all users, can be accomplished. Further, there is no need of associating the photographed images with organizing conditions each time the images has been photographed, thereby enabling automatic image organization without necessitating troublesome manipulations by the user.

Further, since multiple organizing conditions can be stored for one user (one customer ID) in the organizing condition table T1 by identifying each organizing condition by a combination of the customer ID and a sequential number, and the image organizing unit 54 carries out multiple patterns of image organizing processes based on the respective organizing conditions, which are sequentially acquired by the organizing condition acquiring unit 53, various demands for the image organizing condition from the user can be addressed more flexibly.

Furthermore, since the organizing result evaluating unit 55 calculates the evaluation value Sc[k] indicating preferability of each of the multiple patterns of organizing results, and the organizing result display unit 56 displays the organizing results in a manner that the higher the preferability of the organizing result, the higher the display priority of the organizing result, the user can easily determine the most preferable organizing result from the multiple patterns of organizing results.

Next, an image organizing process according to a second embodiment of the invention will be described. The second embodiment differs from the first embodiment in that the organizing conditions and the person information for each user are stored in an IC card carried by the user, in stead of being stored in the storing device (such as the hard disk) of the order receiving device 1. The hardware configuration of the second embodiment is substantially the same as that of the first embodiment as shown in FIGS. 1 and 2, except that the magnetic card 3 is replaced with an IC card 3' having larger storage capacity, and the card reader 5 is replaced with a card reader/writer 5' that can read from and write in the memory of the IC card.

Figure 11:
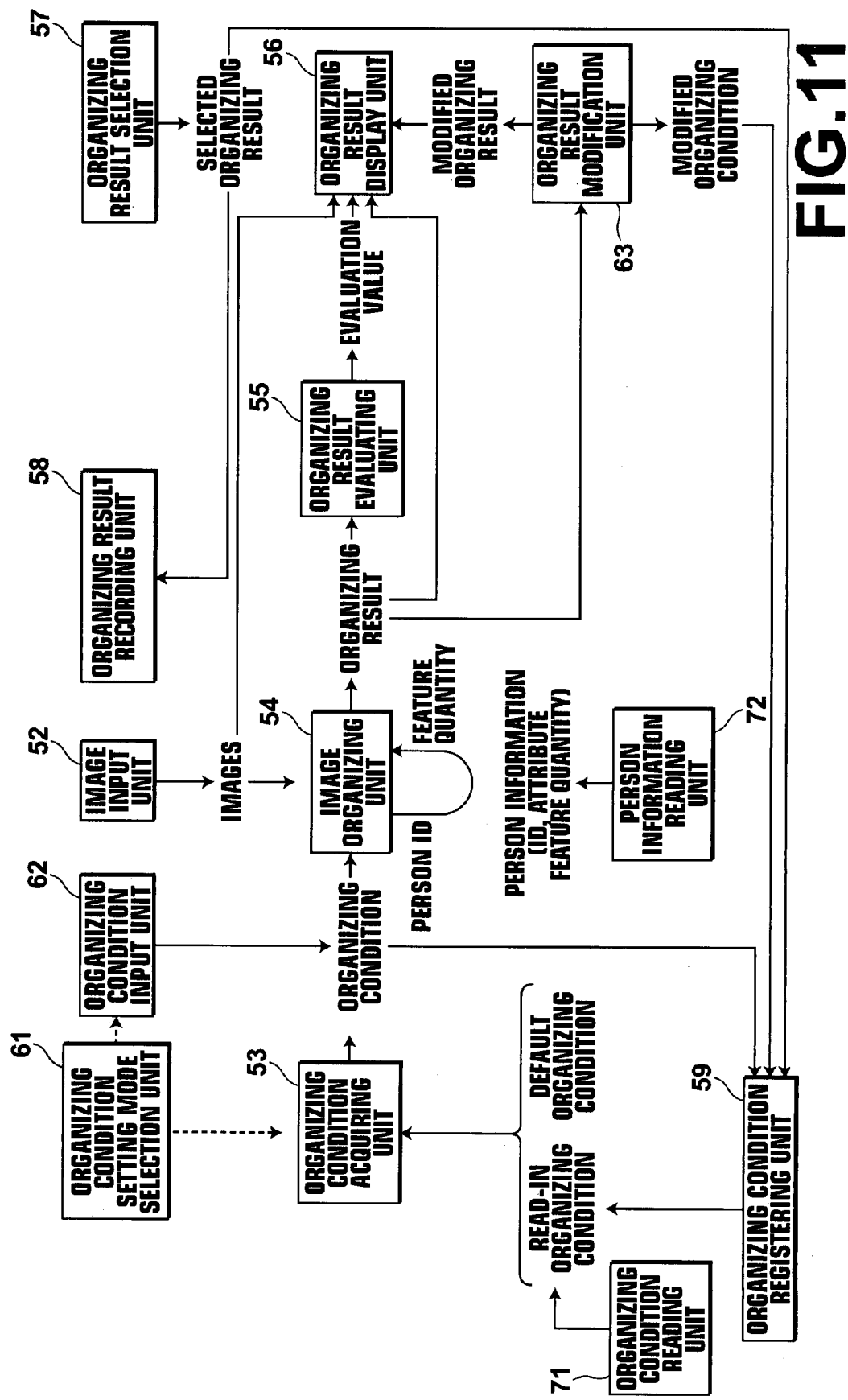
FIG. 11 is a schematic diagram illustrating the main data flow and functional blocks in an image organizing process according to a second embodiment of the invention.

FIG. 11 is a schematic block diagram illustrating the configuration of the order receiving device 1 according to the second embodiment of the invention. As shown in FIG. 11, in stead of the customer ID input unit 51 in the first embodiment, an organizing condition reading unit 71 for reading in the organizing condition and a person information reading unit 72 for reading in the person information, which is formed by an attribute and a feature quantity, associated with each person ID are provided.

The organizing condition reading unit 71 and the person information reading unit 72 causes the display unit 6 to display a message to prompt the user to load the IC card 3' in the card reader/writer 5', such as "Please load the IC card". As the IC card 3' is loaded in the card reader/writer 5', the organizing conditions and the person information are acquired from the memory of the loaded IC card 3'.

These organizing conditions are those used for the past image organizing operations carried out by the user carrying this IC card 3'. The organizing conditions read in by the organizing condition reading unit 71 is temporarily stored in a predetermined storage area (user organizing condition memory) of the system memory 14 of the order receiving device 1. Similarly to the first embodiment, the organizing conditions unique to the user and the device's default organizing conditions are referenced by the organizing condition acquiring unit 53. However, since the user organizing condition memory stores only the organizing conditions unique to the user, the customer ID is not necessary. Therefore, the organizing condition acquiring unit 53 sequentially reads in the organizing conditions stored in the user organizing condition memory from the first one to acquire the organizing conditions. On the other hand, the device's default organizing conditions are read in from the hard disk 24 when the subprogram for carrying out the image organizing process is started, and are stored in a predetermined storage area (default organizing condition memory) of the system memory 14. Since the default organizing conditions are stored separately from the organizing conditions unique to the user, it is not necessary to identify the default organizing conditions by a specific customer ID, or the like. Therefore, the organizing condition acquiring unit 53 sequentially reads in the organizing conditions stored in the default organizing condition memory from the first one to acquire the organizing conditions.

When the organizing condition registering unit 59 registers a new organizing condition, the new organizing condition is written in the memory of the IC card 3' via the card reader/writer 5'.

The pieces of person information are those acquired during the past image organizing operations carried out by the user carrying this IC card 3'. The pieces of person information read in by the person information reading unit 72 are temporarily stored in a predetermined storage area (person information memory) of the system memory 14 of the order receiving device 1. Similarly to the first embodiment, the stored person information is referenced by the image organizing unit 54, as necessary. When a new piece of person information is written, the person information is once written in the person information memory, and when the organizing condition registering unit 58 carries out writing in the IC card 3' via the card reader/writer 5', the content of the person information memory is written in the IC card 3' at the same time.

Figure 5:
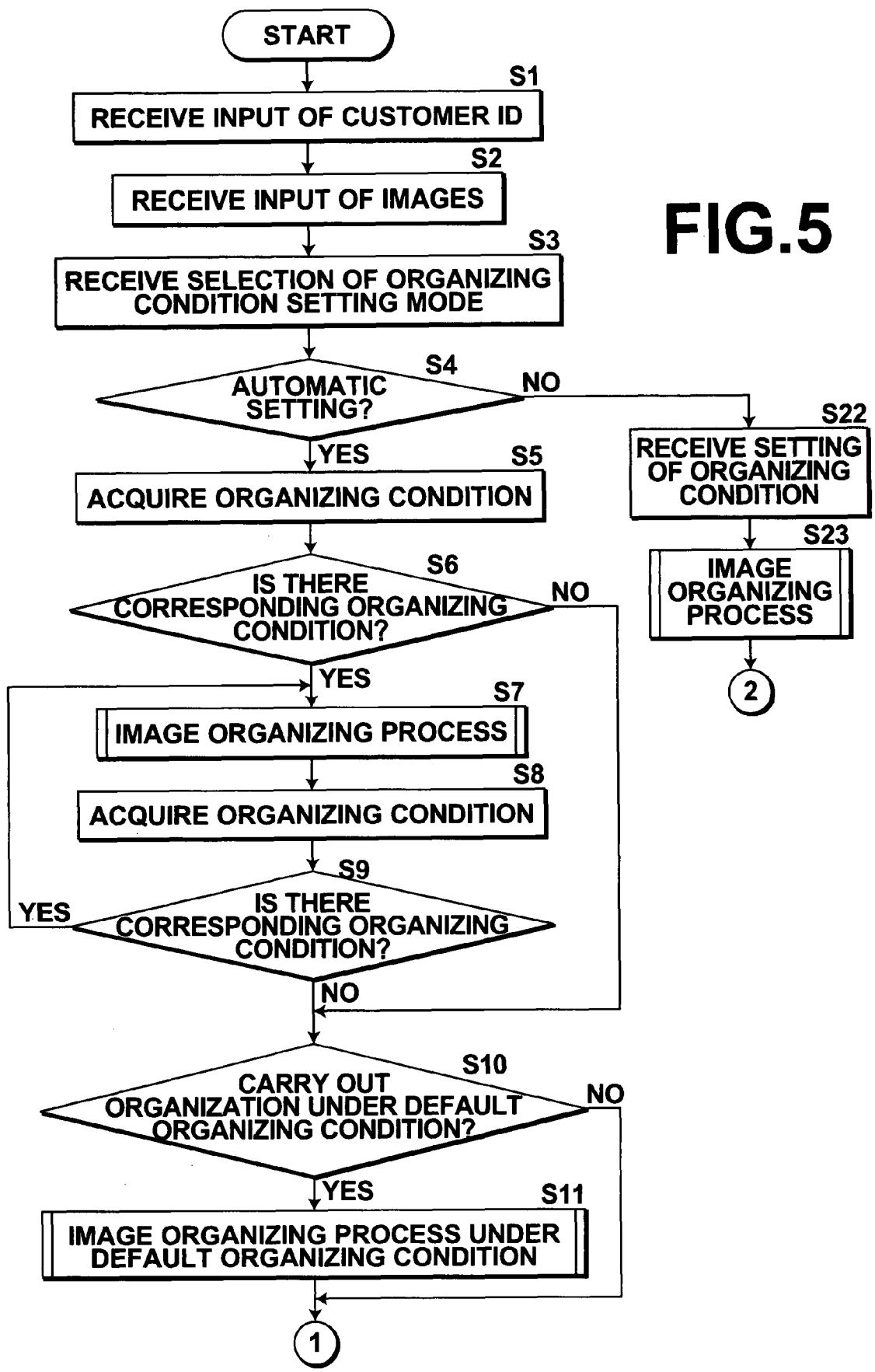
FIG. 5 is a flow chart illustrating the flow of the image organizing process according to the first embodiment of the invention.
Figure 6:
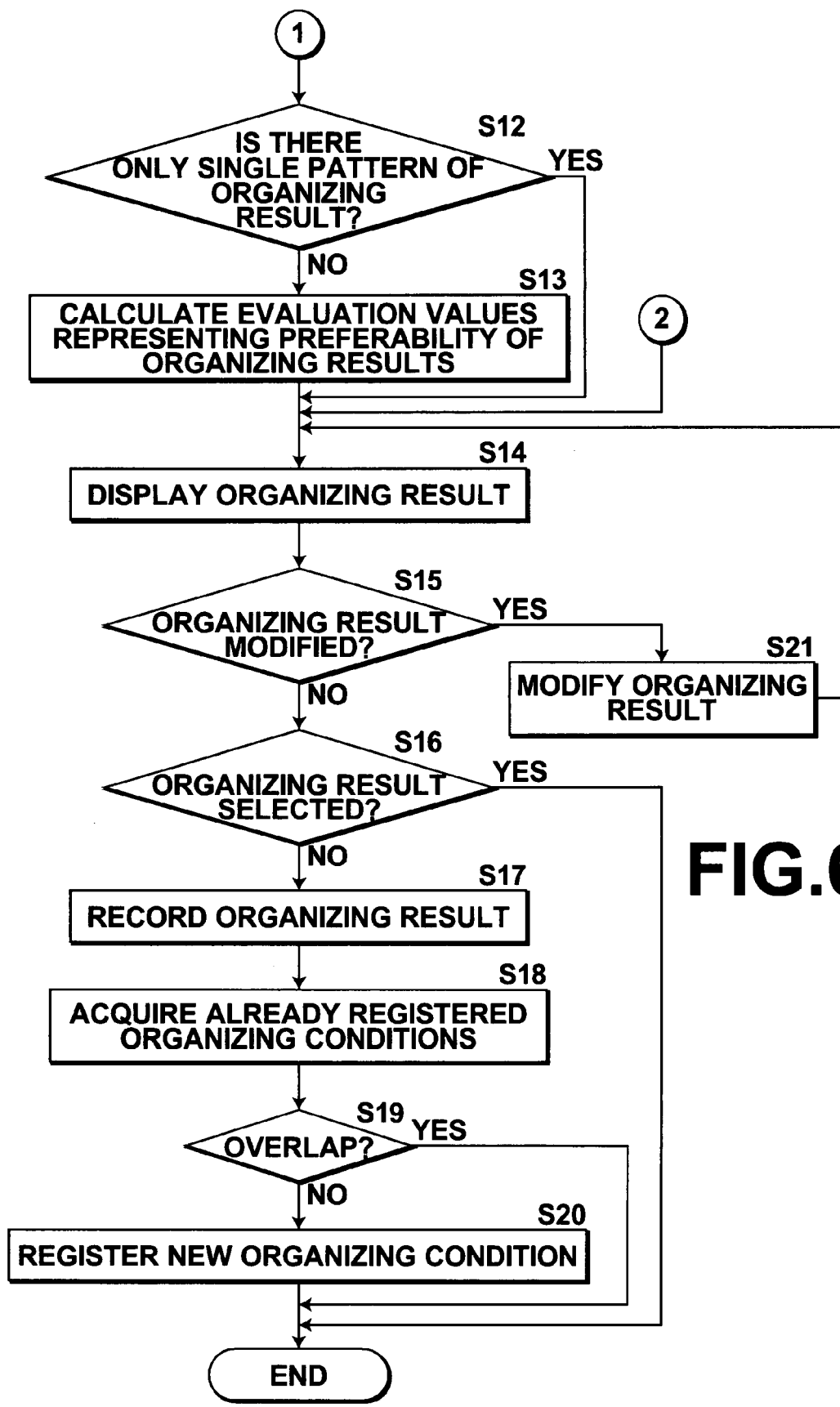
FIG. 6 is a flow chart illustrating the flow of the image organizing process according to the first embodiment of the invention (continued)

The flow of the process in the second embodiment is the same as that in the first embodiment, except that, in the flow chart of the first embodiment shown in FIGS. 5 and 6, the step for receiving an input of the customer ID (step S1) is not carried out, and when the organizing condition is acquired in step S5, the organizing conditions and the pieces of person information unique to the user are read and acquired from the memory of the IC card 3'.

As described above, in the image organizing process according to the second embodiment of the invention, the organizing conditions and the pieces of person information unique to the user are managed in the IC card 3' carried by the user, in stead of being managed in the order receiving device 1. This simplifies management at the order receiving device 1 and enhances protection of the private information. It should be noted that the effect obtained in the first embodiment is similarly obtained in the second embodiment.

According to the present invention, organizing conditions used for past image organizing operations are stored for each user, and when newly inputted images are filed, the organizing conditions associated with the user who carries out the image organization is acquired from the stored organizing conditions, so that the newly inputted images are organized based on the acquired organizing conditions. Therefore, automatic organization of images, which meets the point of view of organization desired by the user better than the conventional image organizing process using a uniform organizing condition for all users, can be accomplished. Further, there is no need of associating photographed images with organizing conditions each time the images has been photographed, thereby enabling automatic image organization without necessitating troublesome manipulations by the user.

Further, since multiple organizing conditions can be stored for each user, and the image organizing processes is carried out in multiple patterns based respectively on the acquired organizing conditions, various demands for the image organizing condition from the user can be addressed more flexibly.

Furthermore, since preferability of each of the organizing results in the multiple patterns is evaluated, the user can easily determine the most preferable organizing result from the multiple patterns of organizing results. This effect is further enhanced by displaying the organizing results in a manner that the higher the preferability of the organizing result, the higher the display priority of the organizing result.

What is claimed is:

1. An image organizing device comprising:
   an image organizing means for organizing a plurality of images inputted thereto based on at least one of a content of each inputted image and an associated attribute of each inputted image;
   an organizing condition storing means for storing an organizing condition used in organization carried out by the image organizing means, the organizing condition being associated with user identifying information for identifying a user of the device;

a user identifying information receiving means for receiving an input of the user identifying information; and an organizing condition acquiring means for acquiring the organizing condition associated with the inputted user identifying information from the organizing condition storing means, wherein the image organizing means carries out organization of newly inputted images based on the acquired organizing condition.

2. An image organizing device comprising:

an image organizing means for organizing a plurality of images inputted thereto based on at least one of a content of each inputted image and an associated attribute of each inputted image;

an organizing condition outputting means for storing an organizing condition used in organization carried out by the image organizing means in a storage medium carried by a user of the device, the storage medium being readable and writable by the device; and an organizing condition acquiring means for acquiring the organizing condition from the storage medium, wherein the image organizing means carries out organization of newly inputted images based on the acquired organizing condition.

3. The image organizing device as claimed in claim 1, wherein:

the organizing condition for each user comprises a plurality of organizing conditions, and when the organizing condition acquiring means acquires the plurality of organizing conditions, the image organizing means carries out the organization in a plurality of patterns based respectively on the acquired organizing conditions; and the image organizing device further comprises an organizing result evaluating means for evaluating preferability of each of results of the organization in the plurality of patterns.

4. The image organizing device as claimed in claim 2, wherein:

the organizing condition for each user comprises a plurality of organizing conditions, and when the organizing condition acquiring means acquires the plurality of organizing conditions, the image organizing means carries out the organization in a plurality of patterns based respectively on the acquired organizing conditions; and the image organizing device further comprises an organizing result evaluating means for evaluating preferability of each of results of the organization in the plurality of patterns.

5. The image organizing device as claimed in claim 3, further comprising an organizing result displaying means for displaying the organizing results in a manner that the higher the preferability of the organizing result evaluated by the organizing result evaluating means, the higher a display priority of the organizing result.

6. The image organizing device as claimed in claim 4, further comprising an organizing result displaying means for displaying the organizing results in a manner that the higher the preferability of the organizing result evaluated by the organizing result evaluating means, the higher a display priority of the organizing result.

7. The image organizing device as claimed in claim 3, wherein the organizing result evaluating means carries out the evaluation based on at least one of the number of classified groups, the number of images in each group and a degree of deviation of the numbers of images in the respective groups.

8. The image organizing device as claimed in claim 4, wherein the organizing result evaluating means carries out the evaluation based on at least one of the number of classified groups, the number of images in each group and a degree of deviation of the numbers of images in the respective groups.

9. An image organizing method comprising:

storing, for each user, an organizing condition for organizing a plurality of inputted images based on at least one of a content of each inputted image and an associated attribute of each inputted image;

when a plurality of newly inputted images are organized, acquiring the stored organizing condition associated with the user who carries out the organization; and organizing the newly inputted images based on the acquired organizing condition.

10. A non-transitory computer-readable recording medium storing an image organizing program for causing a computer to operate as:

an image organizing means for organizing a plurality of images inputted thereto based on at least one of a content of each inputted image and an associated attribute of each inputted image;

an organizing condition storing means for storing an organizing condition used in organization carried out by the image organizing means, the organizing condition being associated with user identifying information for identifying a user of the device;

a user identifying information receiving means for receiving an input of the user identifying information; and an organizing condition acquiring means for acquiring the organizing condition associated with the inputted user identifying information from the organizing condition storing means, wherein the image organizing means carries out organization of newly inputted images based on the acquired organizing condition.

11. A non-transitory computer-readable recording medium storing an image organizing program for causing a computer to operate as:

an image organizing means for organizing a plurality of images inputted thereto based on at least one of a content of each inputted image and an associated attribute of each inputted image;

an organizing condition outputting means for storing an organizing condition used in organization carried out by the image organizing means in a storage medium carried by a user of the device, the storage medium being readable and writable by the device; and an organizing condition acquiring means for acquiring the organizing condition from the storage medium, wherein the image organizing means carries out organization of newly inputted images based on the acquired organizing condition.

* * * * *